US012056050B2

(12) United States Patent
Williams et al.

(10) Patent No.: US 12,056,050 B2
(45) Date of Patent: Aug. 6, 2024

(54) CENTRALIZED DISTRIBUTION OF MULTICAST REQUESTS IN A DATA PROCESSING SYSTEM

(71) Applicant: International Business Machines Corporation, Armonk, NY (US)

(72) Inventors: Derek E. Williams, Round Rock, TX (US); Luke Murray, Austin, TX (US); Guy L. Guthrie, Austin, TX (US); Hugh Shen, Round Rock, TX (US)

(73) Assignee: International Busi Corporation ess Machines, Armonk, NY (US)

( * ) Notice: Subject to any disclaimer, the term of this patent is extended or adjusted under 35 U.S.C. 154(b) by 14 days.

(21) Appl. No.: 18/086,501

(22) Filed: Dec. 21, 2022

(65) Prior Publication Data

US 2024/0211398 A1    Jun. 27, 2024

(51) Int. Cl.
*G06F 12/0802* (2016.01)
*G06F 9/54* (2006.01)
*G06F 12/10* (2016.01)

(52) U.S. Cl.
CPC .......... *G06F 12/0802* (2013.01); *G06F 9/542* (2013.01); *G06F 12/10* (2013.01); *G06F 2212/603* (2013.01)

(58) Field of Classification Search
CPC .. G06F 12/0802; G06F 12/10; G06F 12/0806; G06F 12/0808; G06F 12/0815; G06F 2212/603; G06F 2212/68; G06F 2212/682; G06F 2212/683; G06F 2212/621; G06F 9/542
See application file for complete search history.

(56) References Cited

U.S. PATENT DOCUMENTS

| 6,286,090 | B1 | 9/2001 | Steely, Jr. |
| 9,928,119 | B2 | 3/2018 | Guthrie |
| 10,552,339 | B2 | 2/2020 | Basu |
| 10,817,434 | B2 | 10/2020 | Williams |
| 11,080,188 | B1 * | 8/2021 | Tong .................... G06F 12/1009 |

(Continued)

OTHER PUBLICATIONS

European Patent Office, International Search Report and Written Opinion, Feb. 26, 2024, 17 pages.

(Continued)

*Primary Examiner* — Tracy A Warren
(74) *Attorney, Agent, or Firm* — Brian F. Russell; Joseph P. Curcuru

(57) ABSTRACT

A data processing system includes a master, a central request agent, and a plurality of snoopers communicatively coupled to a system fabric for communicating requests subject to retry. The master issues on the system fabric a multicast request intended for the plurality of snoopers. The central request agent receives the multicast request on the system fabric, assigns the multicast request to a particular state machine among a plurality of state machines in the central request agent, and provides the master a coherence response indicating successful completion of the multicast request. The central request agent repetitively issues on the system fabric a multicast request in association with a machine identifier identifying the particular state machine until a coherence response indicates the multicast request is successfully received by all of the plurality of snoopers.

23 Claims, 24 Drawing Sheets

(56) References Cited

U.S. PATENT DOCUMENTS

| | | | | |
|---|---|---|---|---|
| 2002/0078308 A1* | 6/2002 | Altman | ............... | G06F 12/1027 |
| | | | | 709/212 |
| 2007/0266126 A1 | 11/2007 | Clark | | |
| 2017/0177493 A1* | 6/2017 | Guthrie | ............... | G06F 12/0802 |
| 2020/0201780 A1* | 6/2020 | Williams | ............ | G06F 9/30087 |

OTHER PUBLICATIONS

"Collaborative Adaptive Agent Configuration in Dynamically Changing Cloud Environment," Apr. 24, 2013, 5 pages, IPCOM000226931D, IP.com.

"Scalable Multiprocessor Invalidation Mechanism," Aug. 4, 2003, 2 pages, IPCOM000018735D, IP.com.

"Speculative Restore of History Buffer in a Microprocessor," Jul. 5, 2017, 6 pages, IPCOM000250357D, IP.com.

Freescale Semiconductor, Inc., "Synchronizing Instructions for PowerPC Instruction Set Architecture," Nov. 2006, 8 pages, Document No. AN2540, Austin, TX.

* cited by examiner

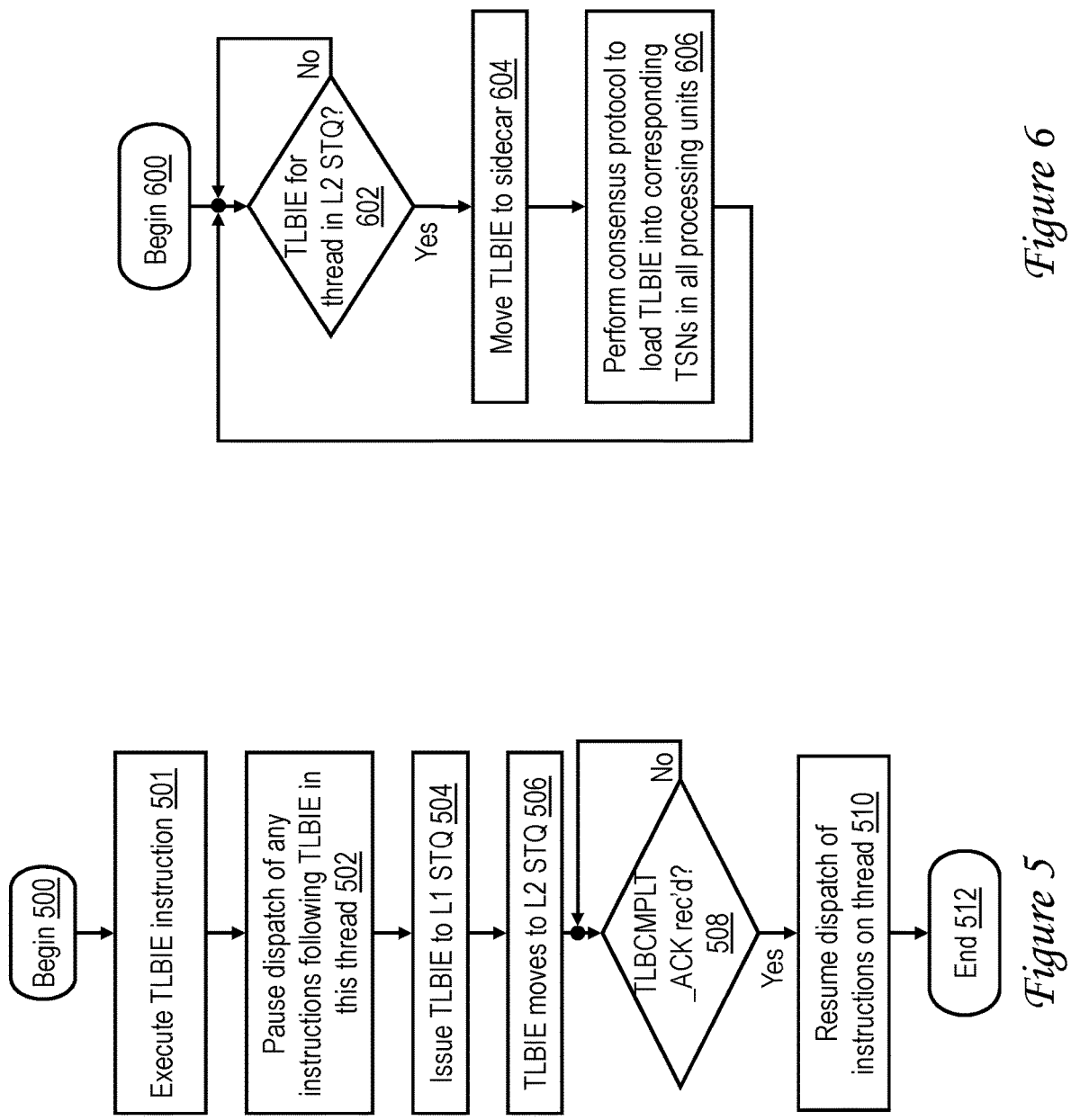

CENTRALIZED DISTRIBUTION OF MULTICAST REQUESTS IN A DATA PROCESSING SYSTEM

BACKGROUND OF THE INVENTION

The present invention relates generally to data processing and, in particular, to distribution of multicast requests, such as translation entry invalidation requests, in a multithreaded data processing system.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In the POWER™ RISC architecture, the effective address space is partitioned into a number of uniformly-sized memory pages, where each page has a respective associated address descriptor called a page table entry (PTE). The PTE corresponding to a particular memory page contains the base effective address of the memory page as well as the associated base real address of the page frame, thereby enabling a processor core to translate any effective address within the memory page into a real address in system memory. The PTEs, which are created in system memory by the operating system and/or hypervisor software, are collected in a page frame table.

In order to expedite the translation of effective addresses to real addresses during the processing of memory-mapped I/O and memory access instructions (hereinafter, together referred to simply as "memory referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated. In many conventional processors such as the POWER™ line of processors available from IBM Corporation, the invalidation of TLB entries is the responsibility of software and is accomplished through the execution of an explicit TLB invalidate entry instruction (e.g., TLBIE in the POWER™ instruction set architecture (ISA)).

In MP computer systems, the invalidation of a PTE cached in the TLB of one processor core is complicated by the fact that each other processor core has its own respective TLB, which may also cache a copy of the target PTE. In order to maintain a consistent view of system memory across all the processor cores, the invalidation of a PTE in one processor core requires the invalidation of the same PTE, if present, within the TLBs of all other processor cores. In many conventional MP computer systems, the invalidation of a PTE in all processor cores in the system is accomplished by the execution of a TLB invalidate entry instruction within an initiating processor core and the broadcast of a TLB invalidate entry request from the initiating processor core to each other processor core in the system. The TLB invalidate entry instruction (or instructions, if multiple PTEs are to be invalidated) may be followed in the instruction sequence of the initiating processor core by one or more synchronization instructions that guarantee that the TLB entry invalidation has been performed by all processor cores.

The present disclosure recognizes that, if not appropriately handled, the broadcast of a TLB invalidate entry request from the initiating processor core to each other processor core in the system can cause a livelock to occur in systems that permit interconnect operations to be retried by recipients. It would therefore be useful and desirable to provide an improved technique for managing distribution of multicast requests, such as translation entry invalidation requests, in a data processing system permitting interconnect operations to be retried.

BRIEF SUMMARY

As noted briefly above, data processing systems that permit multicast requests on the system interconnect to be retried by snoopers are subject to so-called "ping-pong" livelocks. A ping-pong livelock occurs when a first subset of the snoopers accepts and potentially begins processing the multicast request and a second subset of the snoopers issues a retry response to the multicast request indicating inability to currently process the request. In response to the retry response, the master that initiated the multicast request will reissue the multicast request on the system interconnect, potentially leading to one or more snoopers in the second subset accepting the request, and one or more snoopers in the first subset issuing a retry response. Further, one or more snoopers in the first subset may additionally accept the request again when reissued by the master and restart processing of the request.

This scenario illustrates two potential problems with multicast requests in a data processing system in which interconnect requests can be retried. First, a multicast request is not guaranteed to be accepted and processed by all snoopers necessary to complete the multicast request, and second, the multicast request, if retried and reissued, may be repeatedly processed by one or more snoopers.

To avoid ping-pong livelocks for multicast requests, the present disclosure employs a central request agent and associated communication protocol that ensure that a given multicast request will be accepted eventually be each relevant snooper, that the relevant snoopers will process the multicast request only once, even if retried, and that issuance of other multicast request(s) of the same type will not prevent a given multicast request from being accepted by all relevant snoopers. The central request agent has a given number of state machines for tracking multicast requests, and the snoopers having a corresponding number of snoop machines.

Multicast requests issued on the system interconnect by various masters distributed within the data processing system compete to be accepted by a state machine of the central request agent. Once a multicast request is accepted by a given state machine in the central request agent, the central request agent forwards the multicast request to the corresponding snoop machines in different snoopers distributed within the data processing system. As the request is forwarded by the centralized request agent, one or more snoopers may provide a retry coherence response to the multicast request, while one or more other snoopers accept and process the multicast request. A snooper will provide a retry response if a snoop machine in the snooper is still busy working on a prior multicast request assigned to the same snoop machine. Eventually, the multicast request forwarded by the central request agent will be able to be snooped and processed at all relevant snoopers, as indicated to the central request agent by a successful combined response. It should be noted that snoopers do not issue a retry coherence response to a snooped multicast request if the multicast request is the same multicast request that the snoopers are currently processing or have just completed processing.

According to one embodiment, a data processing system includes a master, a central request agent, and a plurality of snoopers communicatively coupled to a system fabric for communicating requests subject to retry. The master issues on the system fabric a multicast request intended for the plurality of snoopers. The central request agent receives the multicast request on the system fabric, assigns the multicast request to a particular state machine among a plurality of state machines in the central request agent, and provides the master a coherence response indicating successful completion of the multicast request. The central request agent repetitively issues on the system fabric a multicast request in association with a machine identifier identifying the particular state machine until a coherence response indicates the multicast request is successfully received by all of the plurality of snoopers.

In at least one embodiment, the multicast request comprises a translation entry invalidation request.

In at least one embodiment, each of the plurality of snoopers includes a plurality of snoop machines corresponding in number to the plurality of state machines in the central request agent, and each of the plurality of snoopers assigns the multicast request received from the central request unit to a particular snoop machine among the plurality of snoop machines that corresponds to the particular state machine.

In at least one embodiment, prior to the repetitively issuing the multicast request, the central request agent modifies the multicast request to indicate the multicast request is forwarded from the central request agent.

In at least one embodiment, in response to the central request agent repetitively issuing the multicast request, one or more of the plurality of snoopers provide a null coherence response to indicate successful receipt of a prior issuance of the multicast request by the central request agent.

In at least one embodiment, the multicast request includes multiple operation tenures on the system fabric. In such embodiments, the central request agent receives at least a first operation tenure and a corresponding second operation tenure and assigns the first and second operation tenures to the particular state machine. The central request agent marks the multicast request as available for distribution to the plurality of snoopers based on assignment of both the first and second operation tenures to the particular state machine.

In at least one embodiment, the central request agent issues the first operation tenure of the multicast request on the system fabric with an epoch indication, and one of the plurality of snoopers discards a previously snooped multicast request based on a mismatching epoch indication.

The disclosed embodiments can be realized as a method, an integrated circuit, a data processing system, and/or a design structure.

BRIEF DESCRIPTION OF THE SEVERAL VIEWS OF THE DRAWINGS

FIG. 5 is a high-level logical flowchart of an exemplary method by which a processor core of a multiprocessor data processing system processes a translation entry invalidation instruction in accordance with one embodiment;

FIG. 6 is a high-level logical flowchart of an exemplary method by which sidecar logic of a processing unit processes a translation entry invalidation request in accordance with one embodiment;

DETAILED DESCRIPTION

Figure 1:
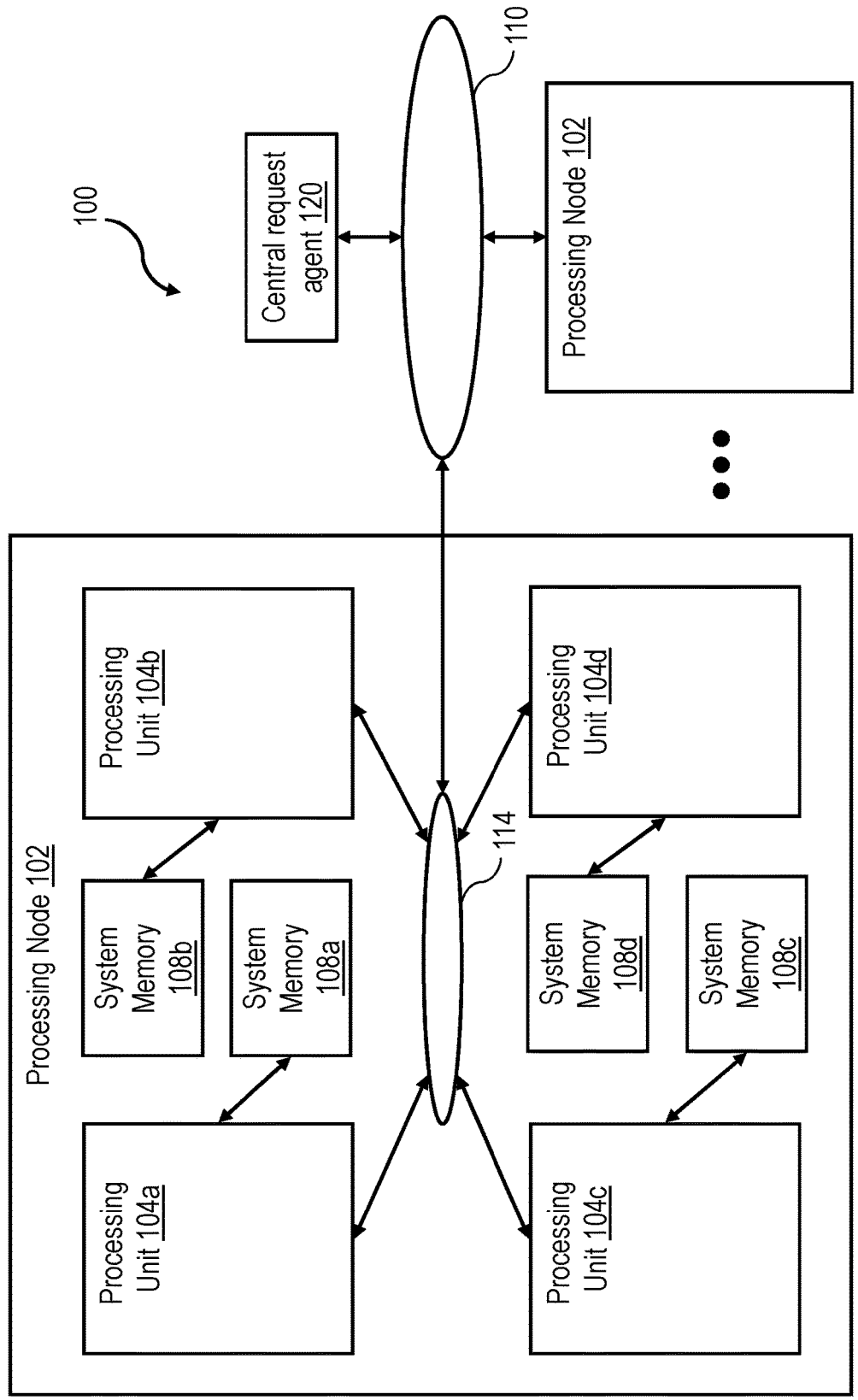
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing multiple (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

FIG. 1 further illustrates that data processing system 100 includes at least one central request agent 120 coupled to the system fabric. As discussed further below with reference to FIG. 18 and following, central request agent 120 can be utilized to distribute certain types of multicast requests via the system fabric, while avoiding the development of livelocks. In some examples, data processing system 100 may include a single central request agent 120, which may conveniently be coupled to system interconnect 110.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
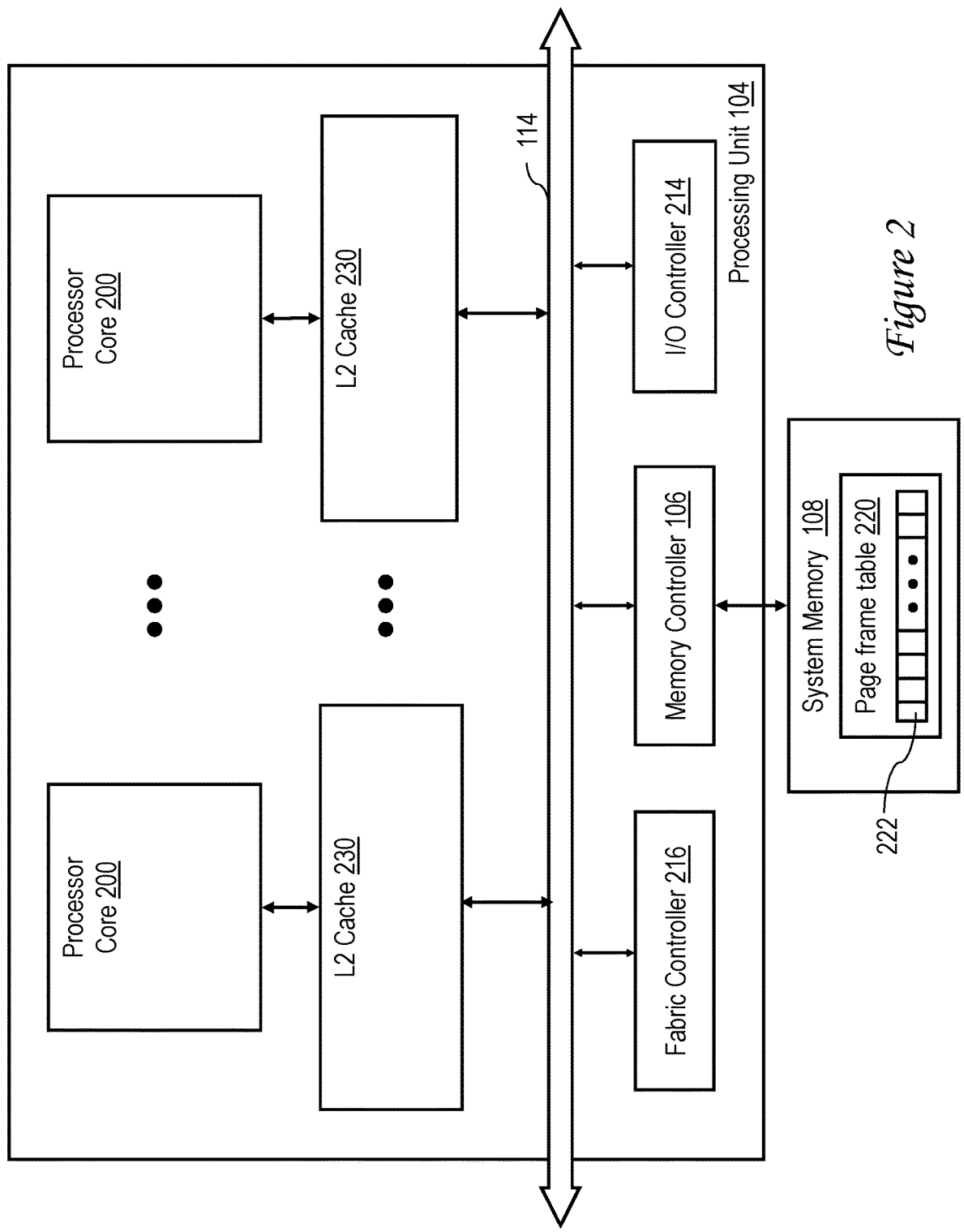
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. As illustrated, shared system memory 108 stores a page frame table 220 containing a plurality of page table entries (PTEs) 222 for performing effective-to-real address translation to enable access to the storage locations in system memory 108. At its upper levels, the multi-level memory hierarchy includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

Figure 3:
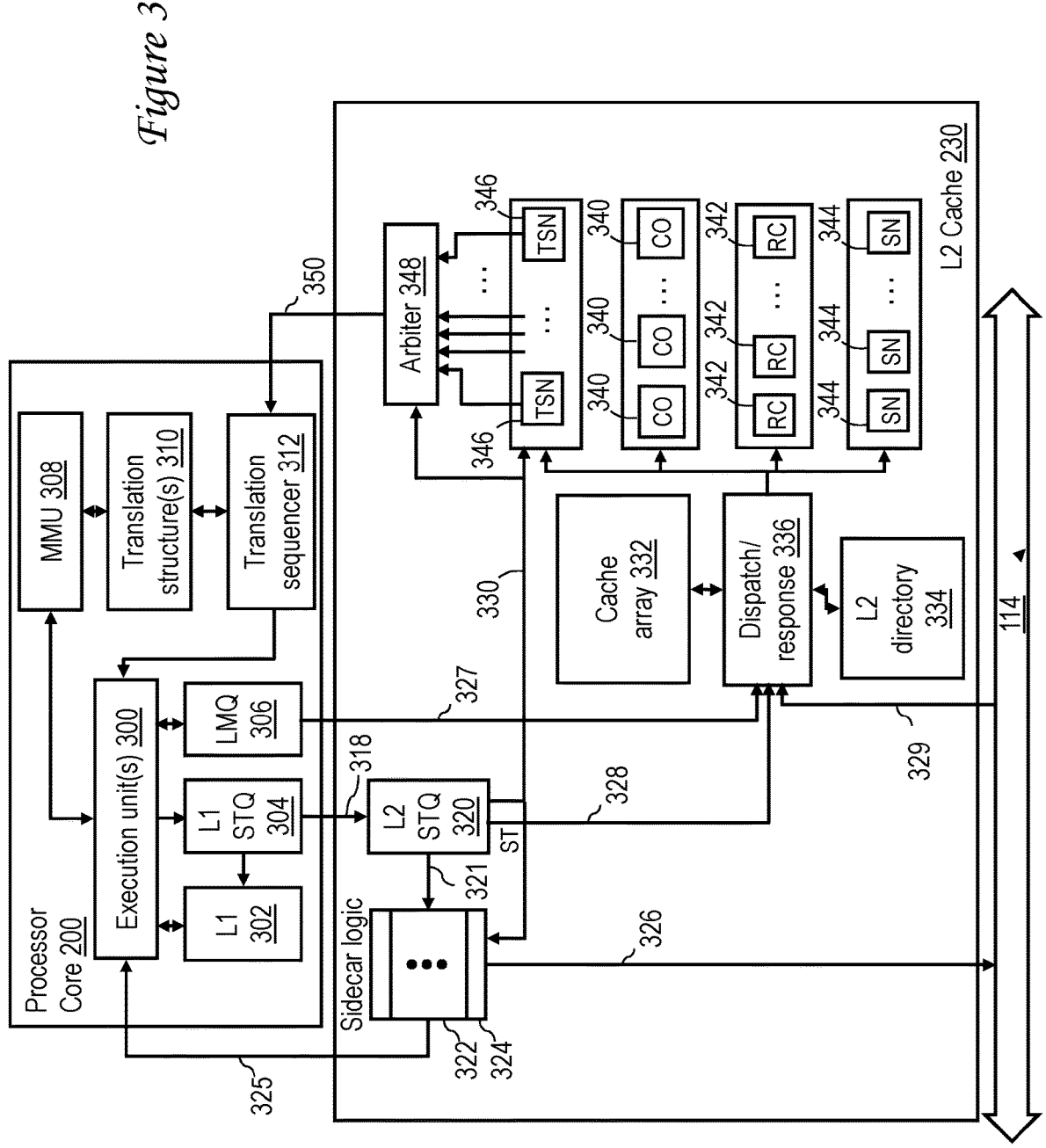
FIG. 3 is a detailed block diagram of a processor core and lower level cache memory in accordance with one embodiment.

With reference now to FIG. 3, there is illustrated a more detailed block diagram of an exemplary embodiment of a processor core 200 and its affiliated L2 cache 230 in accordance with one embodiment.

In the illustrated embodiment, processor core 200 includes one or more execution unit(s) 300, which execute instructions from multiple simultaneous hardware threads of execution. The instructions can include, for example, arithmetic instructions, logical instructions, and memory referent instructions, as well as translation entry invalidation instructions (hereinafter referred to by the POWER™ ISA mnemonic TLBIE (Translation Lookaside Buffer Invalidate Entry)) and associated synchronization instructions. Execution unit(s) 300 can generally execute instructions of a hardware thread in any order as long as data dependencies and explicit orderings mandated by synchronization instructions are observed.

Processor core 200 additionally includes a memory management unit (MMU) 308 responsible for translating target effective addresses determined by the execution of memory referent instructions in execution unit(s) 300 into real addresses. MMU 308 performs effective-to-real address translation by reference to one or more translation structure(s) 310, such as a translation lookaside buffer (TLB), block address table (BAT), segment lookaside buffers (SLBs), etc. The number and type of these translation structures varies between implementations and architectures. If present, the TLB reduces the latency associated with effective-to-real address translation by caching PTEs 222 retrieved from page frame table 220. A translation sequencer 312 associated with translation structure(s) 310 handles invalidation of effective-to-real translation entries held within translation structure(s) 310 and manages such invalidations relative to memory referent instructions in flight in processor core 200.

Processor core 200 additionally includes various storage facilities shared by the multiple hardware threads supported by processor core 200. The storage facilities shared by the multiple hardware threads include an L1 store queue (L1 STQ) 304 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 304 and then pass via bus 318 to L2 cache 230 for processing. The storage facilities of processor core 200 shared by the multiple hardware threads additionally include a load miss queue (LMQ) 306 that temporarily buffers load requests that miss in L1 cache 302. Because such load requests have not yet been satisfied, they are subject to hitting the wrong memory page if the address translation entry utilized to obtain the target real addresses of the load requests are invalidated before the load requests are satisfied. Consequently, if a PTE or other translation entry is to be invalidated, any load requests in LMQ 306 that depends on that translation entry has to be drained from LMQ 306 and be satisfied before the effective address translated by the relevant translation entry can be reassigned.

Still referring to FIG. 3, L2 cache 230 includes a cache array 332 and a L2 directory 334 of the contents of cache array 332. Assuming cache array 332 and L2 directory 334 are set associative as is conventional, storage locations in system memories 108 are mapped to particular congruence classes within cache array 332 utilizing predetermined index bits within the system memory (real) addresses. The particular memory blocks stored within the cache lines of cache array 332 are recorded in L2 directory 334, which contains one directory entry for each cache line. While not expressly depicted in FIG. 3, it will be understood by those skilled in the art that each directory entry in cache directory 334 includes various fields, for example, a tag field that identifies the real address of the memory block held in the corresponding cache line of cache array 332, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 302.

L2 cache 230 additionally includes an L2 STQ 320 that receives storage-modifying requests and synchronization requests from L1 STQ 304 via interface 321 and buffers such requests. It should be noted that L2 STQ 320 is a unified store queue that buffers requests for all hardware threads of the affiliated processor core 200. Consequently, all of the threads' store requests, TLBIE requests and associated synchronization requests flows through L2 STQ 320. Although in most embodiments L2 STQ 320 includes multiple entries, L2 STQ 320 is required to function in a deadlock-free manner regardless of depth (i.e., even if implemented as a single entry queue). To this end, L2 STQ 320 is coupled by an interface 321 to associated sidecar logic 322, which includes one request-buffering entry (referred to herein as a "sidecar") 324 per hardware thread supported by the affiliated processor core 200. As such, the number of sidecars 324 is unrelated to the number of entries in L2 STQ 320. As described further herein, use of sidecars 324 allows potentially deadlocking requests to be removed from L2 STQ 320 so that no deadlocks occur during invalidation of a translation entry.

L2 cache 230 further includes dispatch/response logic 336 that receives local load and store requests initiated by the affiliated processor core 200 via buses 327 and 328, respectively, and remote requests snooped on local interconnect 114 via bus 329. Such requests, including local and remote load requests, store requests, TLBIE requests, and associated synchronization requests, are processed by dispatch/response logic 336 and then dispatched to the appropriate state machines for servicing.

In the illustrated embodiment, the state machines implemented within L2 cache 230 to service requests include multiple Read-Claim (RC) machines 342, which independently and concurrently service load (LD) and store (ST) requests received from the affiliated processor core 200. In order to service remote memory access requests originating from processor cores 200 other than the affiliated processor core 200, L2 cache 230 also includes multiple snoop (SN) machines 344. Each snoop machine 344 can independently and concurrently handle a remote memory access request snooped from local interconnect 114. As will be appreciated, the servicing of memory access requests by RC machines 342 may require the replacement or invalidation of memory blocks within cache array 332 (and L1 cache 302). Accordingly, L2 cache 230 also includes CO (castout) machines 340 that manage the removal and writeback of memory blocks from cache array 332.

In the depicted embodiment, L2 cache 230 additionally includes multiple translation snoop (TSN) machines 346, which are utilized to service TLBIE requests and associated synchronization requests. It should be appreciated that in some embodiments, TSN machines 346 can be implemented in another sub-unit of a processing unit 104, for example, a non-cacheable unit (NCU) (not illustrated) that handles non-cacheable memory access operations. In at least one embodiment, the same number of TSN machines 346 is implemented at each L2 cache 230 in order to simplify implementation of a consensus protocol (as discussed further herein) that coordinates processing of multiple concurrent TLBIE requests within data processing system 100.

TSN machines 346 are all coupled to an arbiter 348 that selects requests being handled by TSN machines 346 for transmission to translation sequencer 312 in processor core 200 via bus 350. In at least some embodiments, bus 350 is implemented as a unified bus that transmits not only requests of TSN machines 346, but also returns data from the L2 cache 230 to processor core 200, as well as other operations. It should be noted that translation sequencer 312 must accept requests from arbiter 348 in a non-blocking fashion in order to avoid deadlock.

Figure 16:
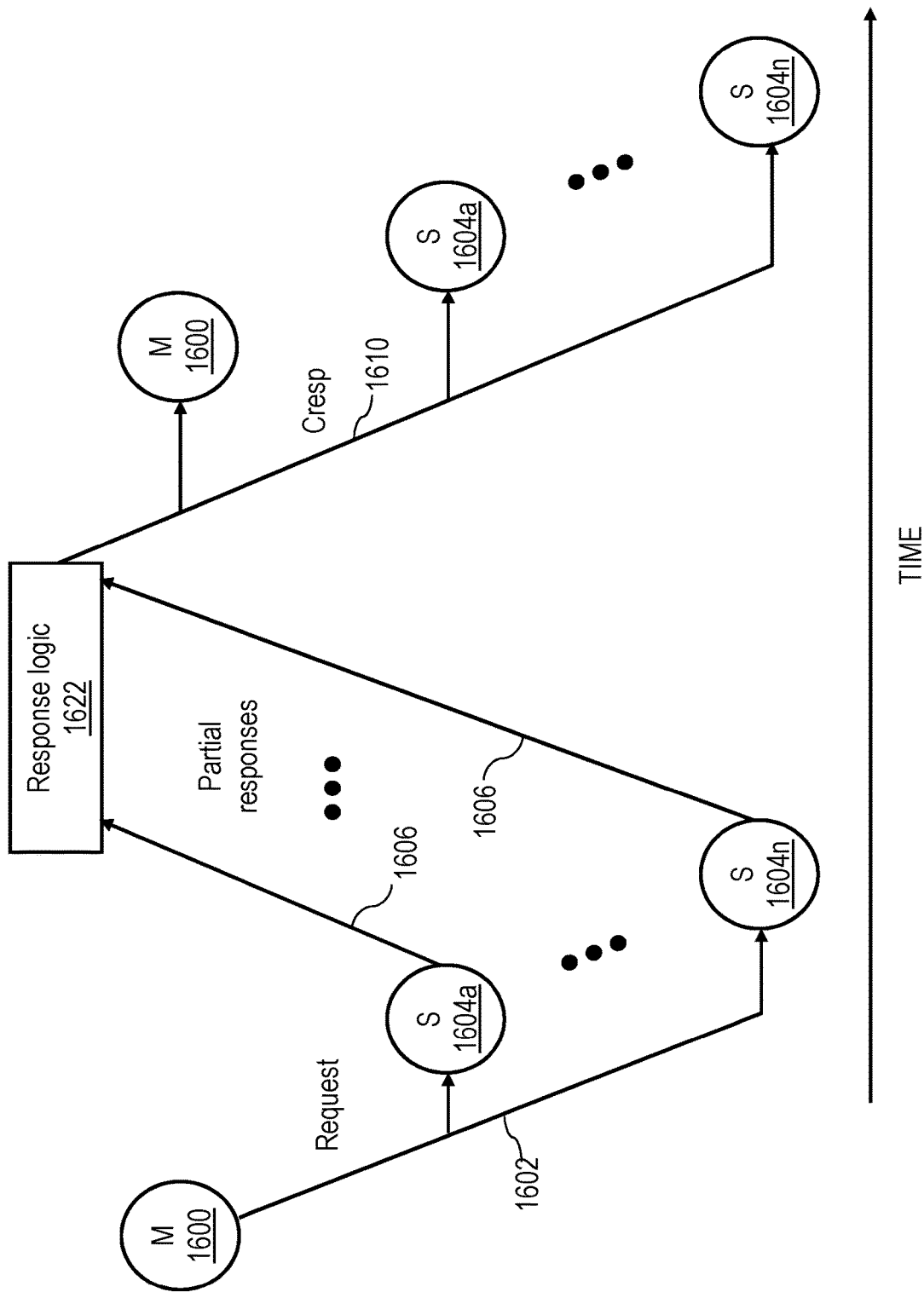
FIG. 16 is a space-time diagram of an interconnect operation on the system fabric of the data processing system of FIG. 1 in accordance with one embodiment.

Referring now to FIG. 16, there is depicted a time-space diagram of an exemplary interconnect operation on the interconnect fabric of data processing system 100 of FIG. 1. The interconnect operation begins when a master 1600 (e.g., a read-claim (RC) machine 342 of an L2 cache 230, a master within an I/O controller 214, a central request agent 120, a master within an unillustrated non-cacheable unit (NCU), etc.) issues a request 1602 on the interconnect fabric. In the example given in FIG. 17, request 1602 includes an address field 1702 for specifying a target real address to be accessed, a transaction type (ttype) field 1710 for specifying the type of access to be made, a tag field (tag) 1720 for identifying the master 1600 initiating request 1602, and a miscellaneous field 1740 for specifying additional request information. In the depicted example, tag field 1720 includes a topographical identifier (ID) 1722 uniquely identifying the master's physical location within data processing system 100, a machine ID 1724 identifying which state machine (e.g., CO 340, RC 342, sidecar 324, etc.) is the master, and a forward (F) field 1726 that is set to indicate that the request is being forwarded from central request agent 120 and is reset otherwise. In some embodiments, tag field 1720 may further include an epoch (E) field 1728 and an operation type (O) field 1730, as discussed further below.

Common types of requests 1602 include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |

TABLE I-continued

| Request | Description |
| --- | --- |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |
| TRANSLATION INVALIDATION (e.g., TLBIE) | Requests invalidation of cached copies of translation entries utilized to translate the effective address of a memory page |

As shown in FIG. 16, request 1602 is received by snoopers 1604a-1604n (e.g., snoop machines 344 of L2 caches 230, central request agent 120, and snoopers of memory controllers 106) distributed throughout data processing system 100. Snoopers 1604 that receive and process requests 1602 may each provide a respective partial response (Presp) 1606 representing the response of at least that snooper 1604 to request 1602. A snooper within a memory controller 106 determines the partial response 1606 to provide based, for example, upon whether the snooper is responsible for the request address and whether it has resources available to service the request. An L2 cache 230 may determine its partial response 1606 based on, for example, the availability of a snoop machine 344 to handle the request, the availability of its L2 directory 334, and the coherency state associated with the target real address in L2 directory 334.

The partial responses 1606 of snoopers 1604a-1604n are logically combined either in stages or all at once by one or more instances of response logic 1622 to determine a system-wide combined response (Cresp) 1610 to request 1602. Although not explicitly shown, Cresp 1610 preferably includes a tag field 1720 corresponding to that of the original request 1602 to enable the master 1600 to match its requests 1602 and combined responses 1610. In one embodiment, which is assumed hereinafter, the instance of response logic 1622 responsible for generating Cresp 1610 is located in the processing unit 104 containing the master 1600 that issued request 1602. Response logic 1622 provides Cresp 1610 to master 1600 and snoopers 1604 via the interconnect fabric to indicate the system-wide coherence response (e.g., success, failure, retry, etc.) to request 1602. If Cresp 1610 indicates success of request 1602, Cresp 1610 may indicate, for example, a data source for a target memory block of request 1602, a coherence state in which the requested memory block is to be cached by master 1600 (or other caches), and whether "cleanup" operations invalidating the requested memory block in one or more caches are required.

In response to receipt of Cresp 1610, one or more of master 1600 and snoopers 1604 may perform one or more additional actions in order to service request 1602. These additional actions may include supplying data to master 1600, invalidating or otherwise updating the coherence state of data cached in one or more L2 caches 230, performing castout operations, writing back data to a system memory 108, etc. If required by request 1602, a requested or target memory block may be transmitted to or from master 1600 before or after the generation of Cresp 1610 by response logic 1622.

Figures 4A, 4B:
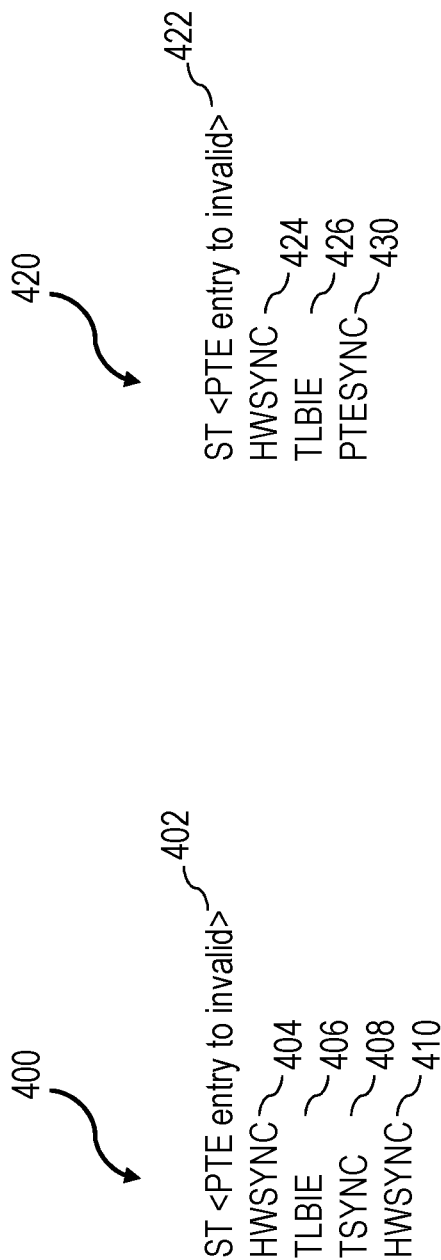
FIG. 4A is a first exemplary translation entry invalidation instruction sequence in accordance with one embodiment.
FIG. 4B is a second exemplary translation entry invalidation instruction sequence in accordance with one embodiment.

Referring now to FIG. 4A, there is depicted a first exemplary translation entry invalidation instruction sequence 400 that may be executed by a processor core 200 of data processing system 100 in accordance with one embodiment. The purpose of instruction sequence 400 is to: (a) disable a translation entry (e.g., PTE 222) in page frame table 220 so that the translation entry does not get reloaded by any MMU 308 of data processing system 100, (b) invalidate any copy of the translation entry (or other translation entry that translates the same effective address as the translation entry) cached by any processor core 200 in data processing system 100, and (c) drain all the outstanding memory access requests that depend on the old translation entry before the effective address is re-assigned. If the translation were updated before the store requests that depend on the old translation entry drain, the store requests may corrupt the memory page identified by old translation entry. Similarly, if load requests that depend on the old translation entry and that miss L1 cache 302 were not satisfied before the translation is reassigned, the load requests would read data from a different memory page than intended and thus observe data not intended to be visible to the load requests.

Instruction sequence 400, which may be preceded and followed by any arbitrary number of instructions, begins with one or more store (ST) instructions 402. Each store instruction 402, when executed, causes a store request to be generated that, when propagated to the relevant system memory 108, marks a target PTE 222 in page frame table 220 as invalid. Once the store request has marked the PTE 222 as invalid in page frame table 220, MMUs 308 will no longer load the invalidated translation from page frame table 220.

Following the one or more store instructions 402 in instruction sequence 400 is a heavy weight synchronization (i.e., HWSYNC) instruction 404, which is a barrier that ensures that the following TLBIE instruction 406 doesn't get reordered by processor core 200 such that it executes in advance of any of store instruction(s) 402. Thus, HWSYNC instruction 404 ensures that if a processor core 200 reloads a PTE 222 from page frame table 220 after TLBIE instruction 406 invalidates cached copies of the PTE 222, the processor core 200 is guaranteed to have observed the invalidation due to a store instruction 402 and therefore will not use or re-load the target PTE 222 into translation structure(s) 310 until the effective address translated by the target PTE 222 is re-assigned and set to valid.

Following HWSYNC instruction 404 in instruction sequence 400 is at least one TLBIE instruction 406, which when executed generates a corresponding TLBIE request that invalidates any translation entries translating the target effective address of the TLBIE request in all translation structures 310 throughout data processing system 100. The one or more TLBIE instructions 406 are followed in instruction sequence 400 by a translation synchronization (i.e., TSYNC) instruction 408 that ensures that, prior to execution of the thread proceeding to succeeding instructions, the TLBIE request generated by execution of TLBIE instruction 406 has finished invalidating all translations of the target effective address in all translation structures 310 throughout data processing system 100 and all prior memory access requests depending on the now-invalidated translation have drained.

Instruction sequence 400 ends with a second HWSYNC instruction 410 that enforces a barrier that prevents any memory referent instructions following HWSYNC instruction 410 in program order from executing until TSYNC instruction 406 has completed its processing. In this manner, any younger memory referent instruction requiring translation of the target effective address of the TLBIE request will receive a new translation rather than the old translation invalidated by TLBIE request. It should be noted that HWSYNC instruction 410 does not have any function directly pertaining to invalidation of the target PTE 222 in page frame table, the invalidation of translation entries in translation structures 310, or draining of memory referent instructions that depend on the old translation.

Figure 11:
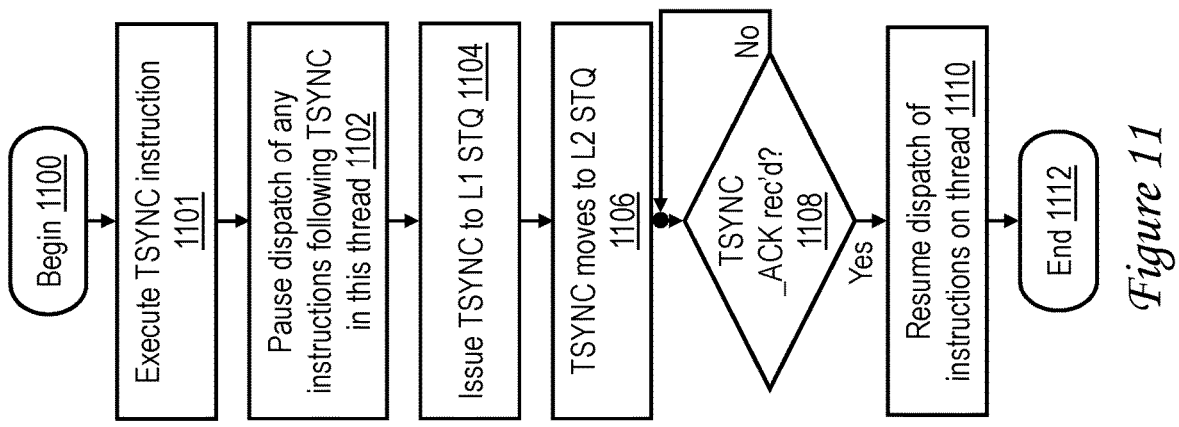
FIG. 11 is a high-level logical flowchart of an exemplary method by which a processor core processes a translation synchronization instruction in accordance with one embodiment.
Figure 12:
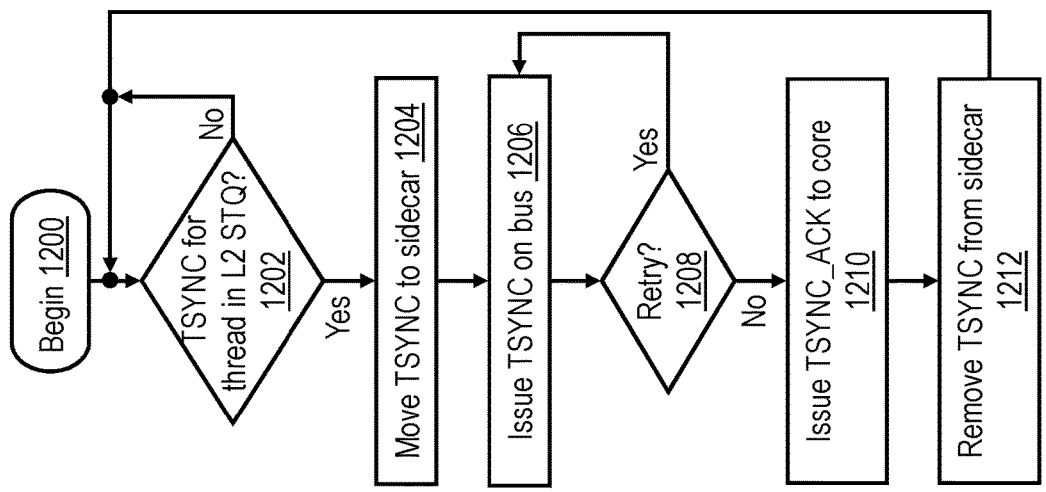
FIG. 12 is a high-level logical flowchart of an exemplary method by which sidecar logic of a processing unit processes a translation synchronization request in accordance with one embodiment.

To promote understanding of the inventions disclosed herein, the progression of a TLBIE instruction 406 and the TLBIE request generated therefrom are described from inception to completion with reference to FIGS. 5-10. FIGS. 11 and 12 additionally depict the progression of TSYNC instruction 408 and its corresponding TSYNC request, which ensure that the invalidation requested by the TLBIE request has completed on all snooping processor cores 200.

Referring first to FIG. 5, there is illustrated a high-level logical flowchart of an exemplary method by which an initiating processor core 200 of a multiprocessor data processing system 100 processes a translation entry invalidation (e.g., TLBIE) instruction in accordance with one embodiment. The illustrated process represents the processing performed in a single hardware thread, meaning that multiple of these processes can be performed concurrently (i.e., in parallel) on a single processor core 200, and further, that multiple of these processes can be performed concurrently on various different processing cores 200 throughout data processing system 100. As a result, multiple different address translation entries buffered in the various processor cores 200 of data processing system 100 can be invalidated by different initiating hardware threads in a concurrent manner.

The illustrated process begins at block 500 and then proceeds to block 501, which illustrates execution of a TLBIE instruction 406 in an instruction sequence 400 by execution unit(s) 300 of a processor core 200. Execution of TLBIE instruction 406 determines a target effective address for which all translation entries buffered in translation structure(s) 310 throughout data processing system 100 are to be invalidated. In response to execution of TLBIE instruction 406, processor core 200 pauses the dispatch of any additional instructions in the initiating hardware thread because in the exemplary embodiment of FIG. 3 sidecar logic 322 includes only a single sidecar 324 per thread, meaning that at most one TLBIE request per thread can be active at a time. In other embodiments having multiple sidecars 324 per thread, multiple concurrently active TLBIE requests per thread can be supported.

At block 504, a TLBIE request corresponding to TLBIE instruction 406 is generated and issued to L1 STQ 304. The TLBIE request may include, for example, a transaction type indicating the type of the request (i.e., TLBIE), the effective address for which cached translations are to be invalidated, and an indication of the initiating processor core 200 and hardware thread that issued the TLBIE request. Processing of requests in L1 STQ 304 progresses, and the TLBIE request eventually moves from L1 STQ 304 to L2 STQ 320 via bus 318 as indicated at block 506. The process then proceeds to block 508, which illustrates that the initiating processor core 200 continues to refrain from dispatching instructions within the initiating hardware thread until it receives a TLBCMPLT_ACK signal from the storage subsystem via bus 325, indicating that processing of the TLBIE request by the initiating processor core 200 is complete. (Generation of the TLBCMPLT_ACK signal is described below with reference to block 1010 of FIG. 10.) It should also be noted that because dispatch of instructions within the initiating thread is paused, there can be no contention for the sidecar 324 of the initiating thread by a TSYNC request corresponding to TSYNC instruction 408, as, for any given thread, only one of the two types of requests can be present in L2 STQ 320 and sidecar logic 322 at a time.

In response to a determination at block 508 that a TLBCMPLT_ACK signal has been received, the process proceeds from block 508 to block 510, which illustrates processor core 200 resuming dispatch of instructions in the initiating thread; thus, release of the thread at block 510 allows processing of TSYNC instruction 408 (which is the next instruction in instruction sequence 400) to begin as described below with reference to FIG. 11. Thereafter, the process of FIG. 5 ends at block 512.

Referring now to FIG. 6, there is depicted a high-level logical flowchart of an exemplary method by which sidecar logic 322 of an L2 cache 230 processes a translation entry invalidation (e.g., TLBIE) request of a hardware thread of the affiliated processor core 200 in accordance with one embodiment. The process of FIG. 6 is performed on a per-thread basis.

The process of FIG. 6 begins at block 600 and then proceeds to block 602, which illustrates sidecar logic 322 determining whether or not a TLBIE request of a hardware thread of the affiliated processor core 200 has been loaded into L2 STQ 320. If not, the process iterates at block 602. However, in response to a determination that a TLBIE of a hardware thread of the affiliated processor core 200 has been loaded into L2 STQ 320, sidecar logic 322 removes the TLBIE request from L2 STQ 320 and moves the TLBIE request via interface 321 into the sidecar 324 corresponding to the initiating thread (block 604). Removal of the TLBIE request from L2 STQ 320 ensures that no deadlock occurs due to inability of L2 STQ 320 to receive incoming requests from the associated processor core 200 and enables such requests to flow through L2 STQ 320.

At block 606, sidecar 324 participates in a consensus protocol via interface 326 and local interconnect 114 to ensure that one (and only one) TSN machine 346 in each and every L2 cache 230 receives its TLBIE request. In some implementations, the consensus protocol may be conventional. In other embodiments described below with reference to FIGS. 18-29, the consensus protocol employed by sidecar 324 to distribute the TLBIE request utilizes a central request agent 120 to manage distribution of the TLBIE request to L2 caches 230. Following block 606, the process returns to block 602, which has been described.

Figure 7:
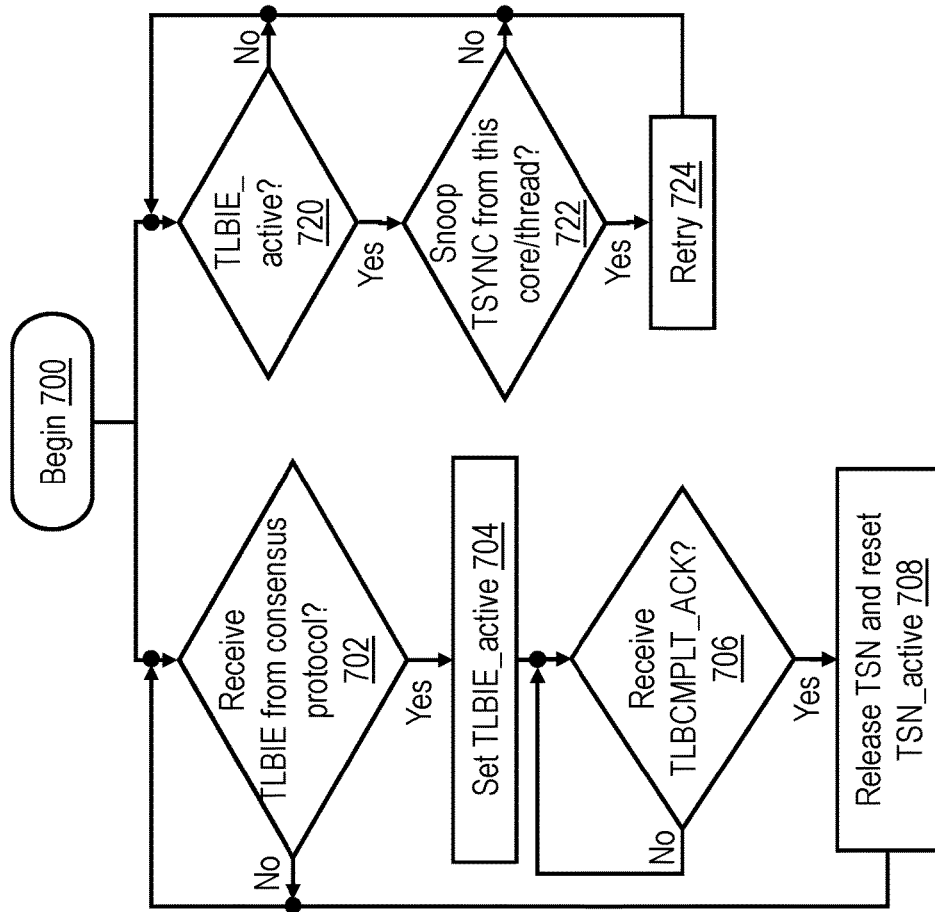
FIG. 7 is a high-level logical flowchart of an exemplary method by which a snooper of a processing unit handles translation entry invalidation requests and translation synchronization requests in accordance with one embodiment.

With reference now to FIG. 7, there is illustrated a high-level logical flowchart of an exemplary method by which TSN machines 346 processes TLBIE requests and TSYNC requests in accordance with one embodiment. The illustrated process is independently and concurrently performed for each TSN machine 346.

The process begins at block 700 and then proceeds to blocks 702 and 720. Block 702 and succeeding block 704 illustrate that in response to notification of receipt of a TLBIE request via the consensus protocol a TSN machine 346 buffers the TLBIE request and assumes a TLBIE_active state. The TLBIE request, which is broadcast over the system fabric 110, 114 to the L2 cache 230 of the initiating processor core 200 and those of all other processor cores 200 of data processing system 100 at block 606 of FIG. 6, is received by an L2 cache 230 via bus 329, processed by dispatch/response logic 336 and then assigned to the TSN machine 346. The TSN machine 346 assuming the TLBIE_active state informs the associated arbiter 348 that a TLBIE request is ready to be processed, as described further below with reference to block 802 of FIG. 8.

Block 706 illustrates TSN machine 346 remaining in the TLBIE_active state until processing of the TLBIE request by the associated processor core 200 (i.e., invalidation of the relevant translation entries in translation structure(s) 310 and draining of relevant memory referent requests from processor core 200) is completed, as indicated by receipt of a TLBCMPLT_ACK signal via bus 330. In response to receipt of the TLBCMPLT_ACK signal, the TLBIE_active state is reset, and the TSN machine 346 is released for reallocation (block 708). Thereafter, the process of FIG. 7 returns from block 708 to block 702, which has been described.

Referring now to blocks 720-724, a TSN machine 346 determines at block 720 if it is in the TLBIE_active state established at block 704. If not, the process iterates at block 720. If, however, the TSN machine 346 is in the TLBIE_active state established at block 704, the TSN machine 346 monitors to determine if a TSYNC request for the initiating hardware thread of its TLBIE request has been detected (block 722). If no TSYNC request is detected, the process continues to iterate at blocks 720-722. However, in response to a detection of a TSYNC request of the initiating hardware thread of its TLBIE request while TSN machine 346 is in the TLBIE_active state, TSN machine 346 provides a Retry coherence response via the system fabric 110, 114, as indicated at block 724. As discussed below with reference to block 1208 of FIG. 12, a Retry coherence response by any TSN machine 346 handling the TLBIE request for the initiating hardware thread forces the TSYNC request to be reissued by the source L2 cache 230 and prevents the initiating hardware thread from progressing to HWSYNC instruction 410 until the TSYNC request completes without a Retry coherence response. The TSYNC request completes without a Retry coherence response when all processor cores 200 other than the initiating processor core 200 have completed their processing of the TLBIE request. (The TSYNC request is not issued by the initiating processor core 200 until it has completed processing the TLBIE request due to the dispatch of instructions being paused for processing of the TLBIE request, as discussed above with reference to block 508 of FIG. 5.)

Figure 8:
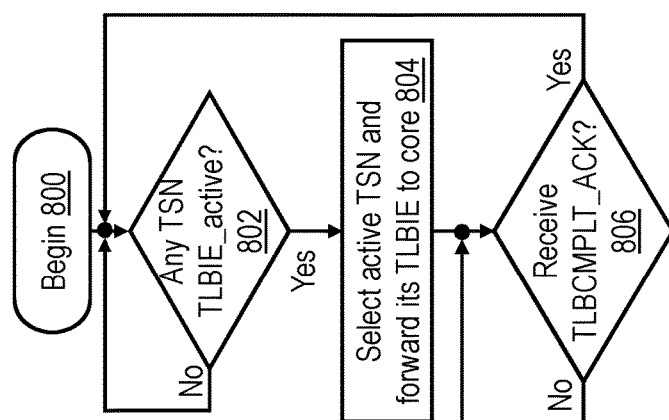
FIG. 8 is a high-level logical flowchart of an exemplary method by which an arbiter of a processing unit processes a translation entry invalidation request in accordance with one embodiment.

Referring now to FIG. 8, there is a high-level logical flowchart of an exemplary method by which an arbiter 348 of the L2 cache 230 processes a TLBIE request in accordance with one embodiment. The process begins at block 800 and then proceeds to block 802, which illustrates arbiter 348 determining whether or not any of its TSN machines 346 is in the TLBIE_active state. If not, the process of FIG. 8 iterates at block 802. However, in response to determining that one or more of its TSN machines 346 is in the TLBIE_active state, arbiter 348 selects one of the TSN machines 346 in the TLBIE_active state that has not been previously had its TLBIE request forwarded and transmits its TLBIE request via bus 350 to the translation sequencer 312 of the affiliated processor core 200 (block 804). To avoid deadlock, translation sequencer 312 is configured to accept TLBIE requests within a fixed time and not arbitrarily delay accepting a TLBIE request.

The process proceeds from block 804 to block 806, which depicts arbiter 348 awaiting receipt of a TLBCMPLT_ACK message indicating that the affiliated processor core 200 has, in response to the TLBIE request, invalidated the relevant translation entry or entries in translation structure(s) 310 and drained the relevant memory referent requests that may have had their target addresses translated by the invalidated translation entries. Thus, at block 806, arbiter 348 is awaiting a TLBCMPLT_ACK message like both the initiating thread (block 508) and a TSN machine 346 in each of the L2 caches 230 (block 706). In response to receipt of a TLBCMPLT_ACK message at block 806, the process returns to block 802, which has been described. It should be noted that by the time the process returns to block 802, the previously selected TSN machine 346 will not still be in the TLBIE_active state for the already processed TLBIE request because the TLBIE_active state will have been reset as illustrated at blocks 706-708 before the process returns to block 802.

The process of FIG. 8 (and blocks 802 and 806 in particular) ensures that only one TLBIE request is being processed by the processor core 200 at a time. The serial processing of TLBIE requests by the processor core 200 eliminates the need to tag TLBCMPLT_ACK messages to associate them with TLBIE requests and simplifies instruction marking mechanisms, as discussed below with reference to FIG. 9. Those skilled in the art will recognize, however, that in other embodiments the processor core 200 can be configured to service multiple TLBIE requests concurrently with some additional complexity.

Figure 9:
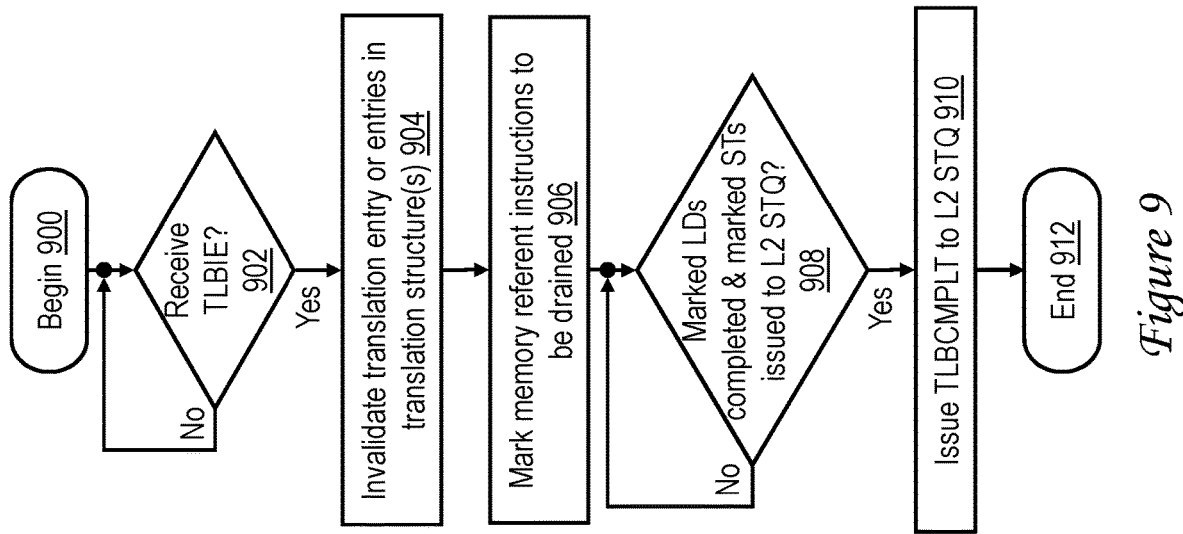
FIG. 9 is a high-level logical flowchart of an exemplary method by which a translation sequencer of a processor core processes a translation entry invalidation request in accordance with one embodiment.

With reference now to FIG. 9, there is illustrated a high-level logical flowchart of an exemplary method by which a translation sequencer 312 of an initiating or snooping processor core 200 processes a TLBIE request in accordance with one embodiment. The process shown in FIG. 9 begins at block 900 and then proceeds to block 902, which illustrates translation sequencer 312 awaiting receipt of a TLBIE request forward by arbiter 348 as described above with reference to block 804 of FIG. 8. In response to receipt of a TLBIE request, translation sequencer 312 invalidates one or more translation entries (e.g., PTEs or other translation entries) in translation structure(s) 310 that translate the target effective address of TLBIE request (block 904). In addition, at block 906, translation sequencer 312 marks all memory referent requests that are to be drained from the processor core 200.

In a less precise embodiment, at block 906 translation sequencer 312 marks all memory referent requests of all hardware threads in processor core 200 that have had their target addresses translated under the assumption that any of such memory referent requests may have had its target address translated by a translation entry or entries invalidated by the TLBIE request received at block 902. Thus, in this embodiment, the marked memory reference requests would include all store requests in L1 STQ 304 and all load requests in LMQ 306. This embodiment advantageously eliminates the need to implement comparators for all entries of L1 STQ 304 and LMQ 306, but can lead to higher latency due to long drain times.

A more precise embodiment implements comparators for all entries of L1 STQ 304 and LMQ 306. In this embodiment, each comparator compares a subset of effective address bits that are specified by the TLBIE request (and that are not translated by MMU 308) with corresponding real address bits of the target real address specified in the associated entry of L1 STQ 304 or LMQ 306. Only the memory referent requests for which the comparators detect a match are marked by translation sequencer 312. Thus, this more precise embodiment reduces the number of marked memory access requests at the expense of additional comparators.

In some implementations of the less precise and more precise marking embodiments, the marking applied by translation sequencer 312 is applied only to requests within processor core 200 and persists only until the marked requests drain from processor core 200. In such implementations, L2 cache 230 may revert to pessimistically assuming all store requests in flight in L2 cache 230 could have had their addresses translated by a translation entry invalidated by the TLBIE request and force all such store requests to be drained prior to processing store requests utilizing a new translation of the target effective address of the TLBIE request. In other implementations, the more precise marking applied by translation sequencer 312 can extend to store requests in flight in L2 cache 230 as well.

The process of FIG. 9 proceeds from block 906 to block 908, which illustrates translation sequencer 312 waiting for the requests marked at block 906 to drain from processor core 200. In particular, translation sequencer 312 waits until all load requests marked at block 906 have had their requested data returned to processor core 200 and all store requests marked at block 906 have been issued to L2 STQ 320. In response to all marked requests draining from processor core 200, translation sequencer 312 inserts a TLBCMPLT request into L2 STQ 320 to indicate that servicing of the TLBIE request by translation sequencer 312 is complete (block 910). Thereafter, the process of FIG. 9 ends at block 912.

Figure 10:
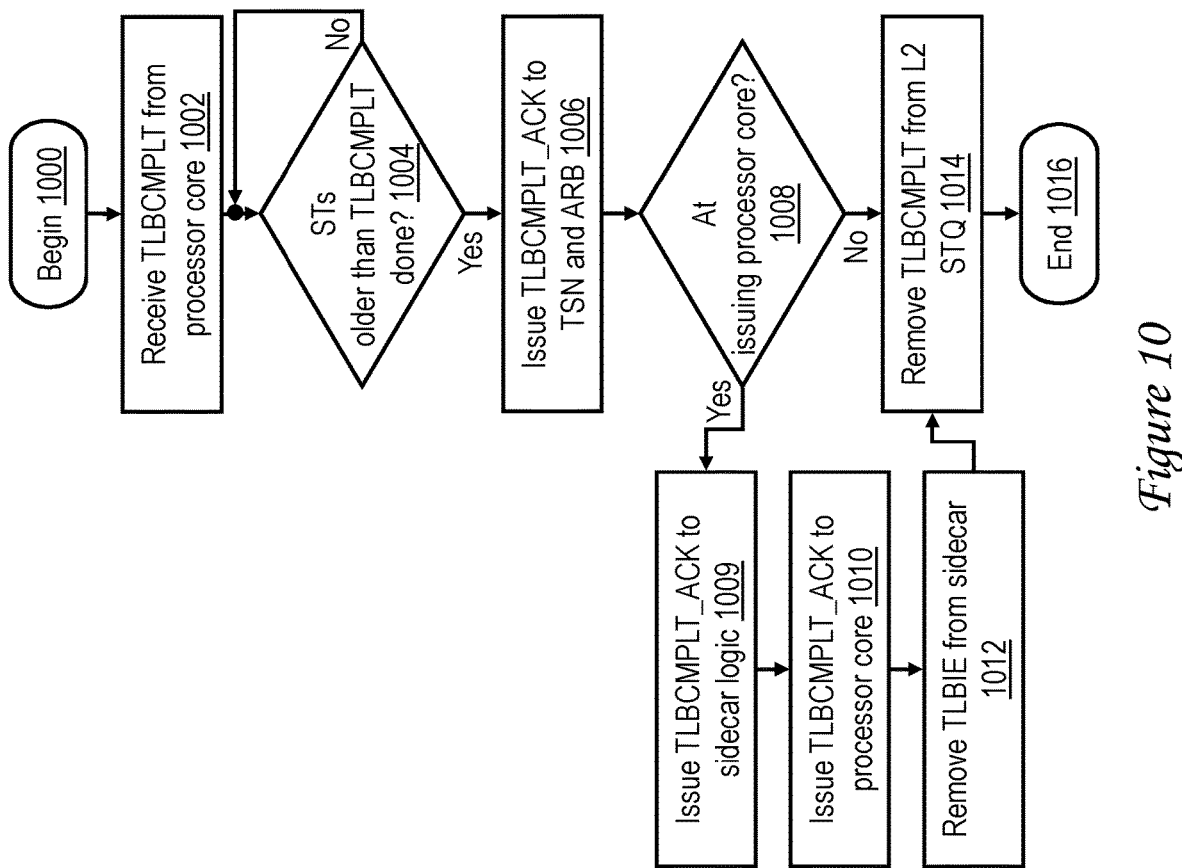
FIG. 10 is a high-level logical flowchart of an exemplary method by which a store queue of a processing unit processes a translation invalidation complete request in accordance with one embodiment.

Referring now to FIG. 10, there is depicted a high-level logical flowchart of an exemplary method by which an L2 STQ 320 processes a TLBCMPLT request in accordance with one embodiment. The process of FIG. 10 begins at block 1000 and then proceeds to block 1002, which illustrates L2 STQ 320 receiving and enqueuing in one of its entries a TLBCMPLT request issued by its associated processor core 200 as described above with reference to block 910 of FIG. 9. At illustrated at block 1004, following receipt of the TLBCMPLT request L2 STQ 320 waits until all older store requests of all hardware threads drain from L2 STQ 320. Once all of the older store requests have drained from L2 STQ 320, the process proceeds from block 1004 to block 1006, which illustrates L2 STQ 320 transmitting a TLBCMPLT_ACK signal via bus 330 to TSN machine 346 that issued the TLBIE request and to arbiter 348, which as noted above with reference to blocks 706 and 806 are awaiting confirmation of completion of processing of the TLBIE request.

At block 1008, L2 STQ 320 determines whether or not the affiliated processor core 200 is the initiating processor core of the TLBIE request whose completion is signaled by the TLBCMPLT request, for example, by examining the thread-identifying information in the TLBCMPLT request. If not (meaning that the process is being performed at an L2 cache 230 associated with a snooping processing core 200), processing of the TLIBIE request is complete, and L2 STQ 320 removes the TLBCMPLT request from L2 STQ 320 (block 1014). Thereafter, the process ends at block 1016.

If, on the other hand, L2 cache 320 determines at block 1008 that its affiliated processor core 200 is the initiating processor core 200 of a TLBIE request buffered in sidecar logic 322, the process proceeds from block 1008 to block 1009, which illustrates L2 STQ 320 issuing the TLBCMPLT_ACK signal to sidecar logic 322 via bus 330. In response to receipt of the TLBCMPLT_ACK signal, sidecar logic 322 issues a TLBCMPLT_ACK signal to the affiliated processor core 200 via bus 325. As noted above with reference to block 508 of FIG. 5, receipt of the TLBCMPLT_ACK signal frees the initiating thread of processor core 200 to resume dispatch of new instructions (i.e., TSYNC instruction 408, whose behavior is explained with reference to FIG. 11). The relevant sidecar 324 then removes the completed TLBIE request (block 1012), and the process passes to blocks 1014 and 1016, which have been described.

With reference now to FIG. 11, there is illustrated a high-level logical flowchart of an exemplary method by which a processor core 200 processes a translation synchronization (e.g., TSYNC) instruction in accordance with one embodiment.

The illustrated process begins at block 1100 and then proceeds to block 1101, which illustrates execution of a TSYNC instruction 408 in an instruction sequence 400 by execution unit(s) 300 of a processor core 200. In response to execution of TSYNC instruction 408, processor core 200 pauses the dispatch of any following instructions in the hardware thread (block 1102). As noted above, dispatch is paused because in the exemplary embodiment of FIG. 3 sidecar logic 322 includes only a single sidecar 324 per hardware thread of the processor core 200, meaning that at most one TLBIE or TSYNC request per thread can be active at a time.

At block 1104, a TSYNC request corresponding to TSYNC instruction 408 is generated and issued to L1 STQ 304. The TSYNC request may include, for example, a transaction type indicating the type of the request (i.e., TSYNC) and an indication of the initiating processor core 200 and hardware thread that issued the TSYNC request. Processing of requests in L1 STQ 304 progresses, and the TSYNC request eventually moves from L1 STQ 304 to L2 STQ 320 via bus 318 as indicated at block 1106. The process then proceeds to block 1108, which illustrates that the initiating processor core 200 continues to refrain from dispatching instructions within the initiating hardware thread until it receives a TSYNC_ACK signal from the storage subsystem via bus 325, indicating that processing of the TSYNC request by the initiating processor core 200 is complete. (Generation of the TSYNC_ACK signal is described below with reference to block 1210 of FIG. 12.) It should again be noted that because dispatch of instructions within the initiating thread is paused, there can be no contention for the sidecar 324 of the initiating hardware thread by another TLBIE request, as, for any given thread, only one of the two types of requests can be present in L2 STQ 320 and sidecar logic 322 at a time.

In response to a determination at block 1108 that a TSYNC_ACK signal has been received, the process proceeds to block 1110, which illustrates processor core 200 resuming dispatch of instructions in the initiating thread; thus, release of the thread at block 1110 allows processing of HWSYNC instruction 410 (which is the next instruction in instruction sequence 400) to begin. Thereafter, the process of FIG. 11 ends at block 1112.

Referring now to FIG. 12, there is depicted a high-level logical flowchart of an exemplary method by which sidecar logic 324 processes a TSYNC request in accordance with one embodiment. The process begins at block 1200 and then proceeds to block 1202, which depicts sidecar logic 324 monitoring for notification via interface 321 that a TSYNC request has been enqueued in L2 STQ 320. In response to receipt of notification via interface 321 that a TSYNC request has been enqueued in L2 STQ 320, sidecar logic 322 moves the TSYNC request via interface 321 to the sidecar 324 of the initiating hardware thread (block 1204). In response to receiving the TSYNC request, the sidecar 324 issues the TSYNC request on system fabric 110, 114 via interface 326 (block 1206) and then monitors the coherence response to the TSYNC request to determine whether or not any TSN machine 346 provided a Retry coherence response as previously described with respect to block 724 of FIG. 7 (block 1208). As noted above, a TSN machine 346 provides a Retry coherence response if the TSN machine is still in the TLBIE_active state and waiting for its snooping processor core 200 to complete processing of the preceding TLBIE request of the same initiating processor core 200 and hardware thread. It can be noted that by the time a TSYNC request is issued, the issuing processing unit's TSN machine 346 will no longer be in the TLBIE_active state and will not issue a Retry coherence response because the TLBCMPLT_ACK signal resets the issuing processor core's TSN machine 346 to an inactive state at block 1006 before the TLBCMPLT_ACK is issued to the initiating processor core 200 at block 1010. Receipt of the TLBCMPLT_ACK signal by the processor core 200 causes the initiating processor core 200 to resume dispatching instructions after the TLBIE instruction 406 and thus execute TSYNC instruction 408 to generate the TSYNC request. However, the initiating processor core 200 may complete processing the TLBIE request long before the snooping processing cores 200 have completed their translation entry invalidations and drained the memory referent instructions marked as dependent or possibly dependent on the invalidated translation entries. Consequently, the TSYNC request ensures that the invalidation of the translation entries and draining of the memory referent instructions dependent on the invalidated translation entries at the snooping processing cores 200 is complete before the initiating processor core 200 executes HWSYNC instruction 410.

Once the all the snooping processor cores 200 have completed their processing of the TLBIE request, eventually the TSYNC request will complete without a Retry coherence response. In response to the TSYNC request completing without a Retry coherence response at block 1208, the sidecar 324 issues a TSYNC_ACK signal to the initiating processor core 200 via bus 325 (block 1210). As described above with reference to block 1108, in response to receipt of the TSYNC_ACK signal the initiating processor core 200 executes HWSYNC instruction 410, which completes the initiating thread's ordering requirements with respect to younger memory referent instructions. Following block 1210, the sidecar 324 removes the TSYNC request (block 1212), and the process returns to block 1202, which has been described.

Having now described instruction sequence 400 of FIG. 4A and the associated processing in detail with reference to FIGS. 5-12, reference is now made to FIG. 4B, which illustrates an alternative code sequence 420 that reduces the number of instructions, and in particular, synchronization instructions, in the translation invalidation sequence. As shown, instruction sequence 420 includes one or more store instructions 422 to invalidate PTEs 222 in page frame table 220, a HWSYNC instruction 424, and one or more TLBIE instructions 426 that invalidate cached translation entries for specified effective addresses in all processor cores 200. Instructions 422-426 thus correspond to instructions 402-406 of instruction sequence 400 of FIG. 4A. Instruction sequence 420 additionally includes a PTESYNC instruction 430 immediately following TLBIE instruction 426. PTESYNC instruction 430 combines the work performed by TSYNC instruction 408 and HWSYNC instruction 410 of instruction sequence 400 of FIG. 4A into a single instruction. That is, execution of PTESYNC instruction 430 generates a PTESYNC request that is broadcast to all processing units 104 of data processing system 100 to both ensure systemwide completion of the TLBIE request generated by TLBIE instruction 426 (as does the TSYNC request generated by execution of TSYNC instruction 408) and to enforce instruction ordering with respect to younger memory referent instructions (as does the HWSYNC request generated by execution of HWSYNC instruction 410).

Given the similarities of instruction sequence 420 and 400, processing of instruction sequence 420 is the same as that for instruction sequence 400 given in FIGS. 5-12, except for the processing related to the PTESYNC request generated by execution of PTESYNC instruction 430, which is described below with reference to FIGS. 13-15.

Figure 13:
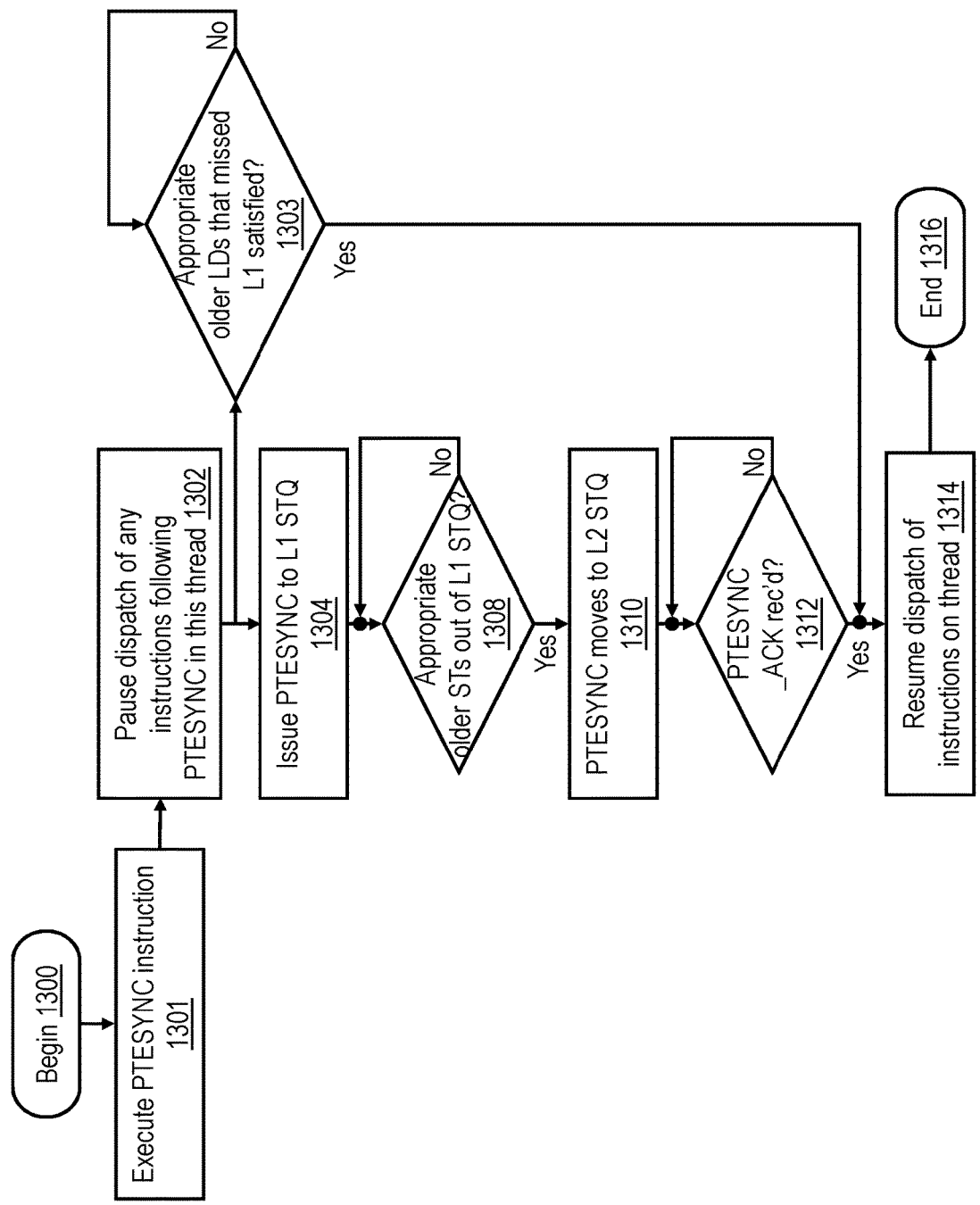
FIG. 13 is a high-level logical flowchart of an exemplary method by which a processing core processes a page table synchronization instruction in accordance with one embodiment.

With reference now to FIG. 13, there is illustrated a high-level logical flowchart of an exemplary method by which a processing core 200 processes a page table synchronization (e.g., PTESYNC) instruction 430 in accordance with one embodiment. As noted above, PTESYNC instruction 430 and the PTESYNC request generated by its execution have two functions, namely, ensuring systemwide completion of the TLBIE request(s) generated by TLBIE instruction(s) 426 and to enforce instruction ordering with respect to younger memory referent instructions.

The illustrated process begins at block 1300 and then proceeds to block 1301, which illustrates a processor core 200 generating a PTESYNC request by execution of a PTESYNC instruction 430 in an instruction sequence 420 in execution unit(s) 300. The PTESYNC request may include, for example, a transaction type indicating the type of the request (i.e., PTESYNC) and an indication of the initiating processor core 200 and hardware thread that issued the PTESYNC request. In response to execution of PTESYNC instruction 430, processor core 200 pauses the dispatch of any younger instructions in the initiating hardware thread (block 1302). As noted above, dispatch is paused because in the exemplary embodiment of FIG. 3 sidecar logic 322 includes only a single sidecar 324 per hardware thread of the processor core 200, meaning that in this embodiment at most one TLBIE or PTESYNC request per thread can be active at a time.

Following block 1302, the process of FIG. 13 proceeds in parallel to block 1303 and blocks 1304-1312. Block 1303 represents the initiating processor core 200 performing the load ordering function of the PTESYNC request by waiting for all appropriate older load requests of all hardware threads (i.e., those that would be architecturally required by a HWSYNC to receive their requested data prior to completion of processing of the HWSYNC request) to drain from LMQ 306. By waiting for these load requests to be satisfied at block 1303, it is guaranteed that the set of load requests identified at block 906 will receive data from the correct memory page (even if the target address was on the memory page being reassigned) rather than a reassigned memory page.

In parallel with block 1303, processor core 200 also issues the PTESYNC request corresponding to PTESYNC instruction 430 to L1 STQ 304 (block 1304). The process proceeds from block 1304 to block 1308, which illustrates processor core 200 performing the store ordering function of the PTESYNC request by waiting until all appropriate older store requests of all hardware threads (i.e., those that would be architecturally required by a HWSYNC to have drained from L1 STQ 304) to drain from L1 STQ 304. Once the store ordering performed at block 1308 is complete, the PTESYNC request is issued from L1 STQ 304 to L2 STQ 320 via bus 318 as indicated at block 1310.

The process then proceeds from block 1310 to block 1312, which illustrates the initiating processor core 200 monitoring to detect receipt of a PTESYNC_ACK signal from the storage subsystem via bus 325 indicating that processing of the PTESYNC request by the initiating processor core 200 is complete. (Generation of the PTESYNC_ACK signal is described below with reference to block 1410 of FIG. 14.) It should again be noted that because dispatch of instructions within the initiating hardware thread remains paused, there can be no contention for the sidecar 324 of the initiating hardware thread by another TLBIE request, as, for any given thread, only one of a TLBIE request or PTESYNC request can be present in L2 STQ 320 and sidecar logic 322 at a time.

Only in response to affirmative determinations at both of blocks 1303 and 1312, the process of FIG. 13 proceeds to block 1314, which illustrates processor core 200 resuming dispatch of instructions in the initiating thread; thus, release of the thread at block 1314 allows processing of instructions following PTESYNC instruction 430 to begin. Thereafter, the process of FIG. 13 ends at block 1316.

Figure 14:
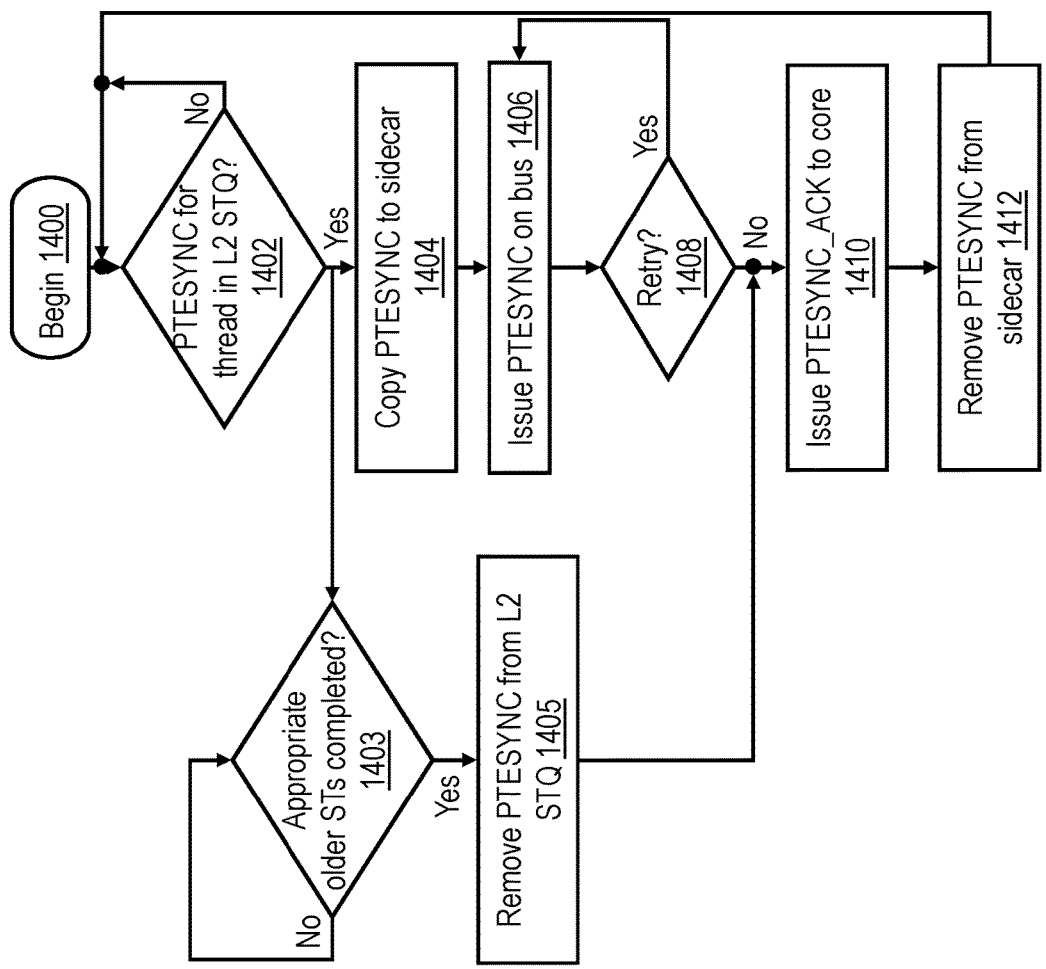
FIG. 14 is a high-level logical flowchart of an exemplary method by which a processing unit processes a page table synchronization request in accordance with one embodiment.

Referring now to FIG. 14, there is depicted a high-level logical flowchart of an exemplary method by which L2 STQ 320 and sidecar logic 322 of a processing unit 104 process a PTESYNC request in accordance with one embodiment. The process of FIG. 14 begins at block 1400 and then proceeds to block 1402, which depicts L2 STQ 320 monitoring for receipt of a PTESYNC request from L1 STQ 304, as described above with reference to block 1310 of FIG. 13. In the second embodiment of FIG. 4B, in response to receipt of the PTESYNC request, L2 STQ 320 and sidecar logic 324 cooperate to perform two functions, namely, (1) store ordering for store requests within L2 STQ 320 and (2) ensuring completion of the TLBIE request at all of the other processing cores 200. In the embodiment of FIG. 14, these two functions are performed in parallel along the two paths illustrated at blocks 1403, 1405 and blocks 1404, 1406 and 1408, respectively. In alternative embodiments, these functions could instead be serialized by first performing the ordering function illustrated at blocks 1403 and 1405 and then ensuring completion of the TLBIE request at blocks 1404, 1406, and 1408. (It should be noted that attempting to serialize the ordering of these function by ensuring completion of the TLBIE request prior to performing store ordering can create a deadlock.)

Referring now to block 1403-1405, L2 STQ 320 performs store ordering for the PTESYNC request by ensuring that all appropriate older store requests within L2 STQ 320 have been drained from L2 STQ 320. The set of store requests that are ordered at block 1403 includes a first subset that may have had their target addresses translated by the translation entry invalidated by the earlier TLBIE request. This first subset corresponds to those marked at block 906. In addition, the set of store requests that are ordered at block 1403 includes a second subset that includes those architecturally defined store requests would be ordered by a HWSYNC. Once all such store requests have drained from L2 STQ 320, L2 STQ 320 removes the PTESYNC request from L2 STQ 320 (block 1405). Removal of the PTESYNC request allows store requests younger than the PTESYNC request to flow through L2 STQ 320.

Referring now to block 1404, sidecar logic 322 detects the presence of the PTESYNC request in L2 STQ 320 and copies the PTESYNC request to the appropriate sidecar 324 via interface 321 prior to removal of the PTESYNC request from L2 STQ 320 at block 1405. The process then proceeds to the loop illustrated at blocks 1406 and 1408 in which sidecar logic 322 continues to issue PTESYNC requests on system fabric 110, 114 until no processor core 200 responds with a Retry coherence response (i.e., until the preceding TLBIE request of the same processor core and hardware thread has been completed by all snooping processor cores 200).

Only in response to completion of both of the functions depicted at blocks 1403, 1405 and blocks 1404, 1406 and 1408, the process proceeds to block 1410, which illustrates sidecar logic 322 issuing a PTESYNC_ACK signal to the affiliated processor core via bus 325. Sidecar logic 322 then removes the PTESYNC request from the sidecar 324 (block 1412), and the process returns to block 1402, which has been described.

Figure 15:
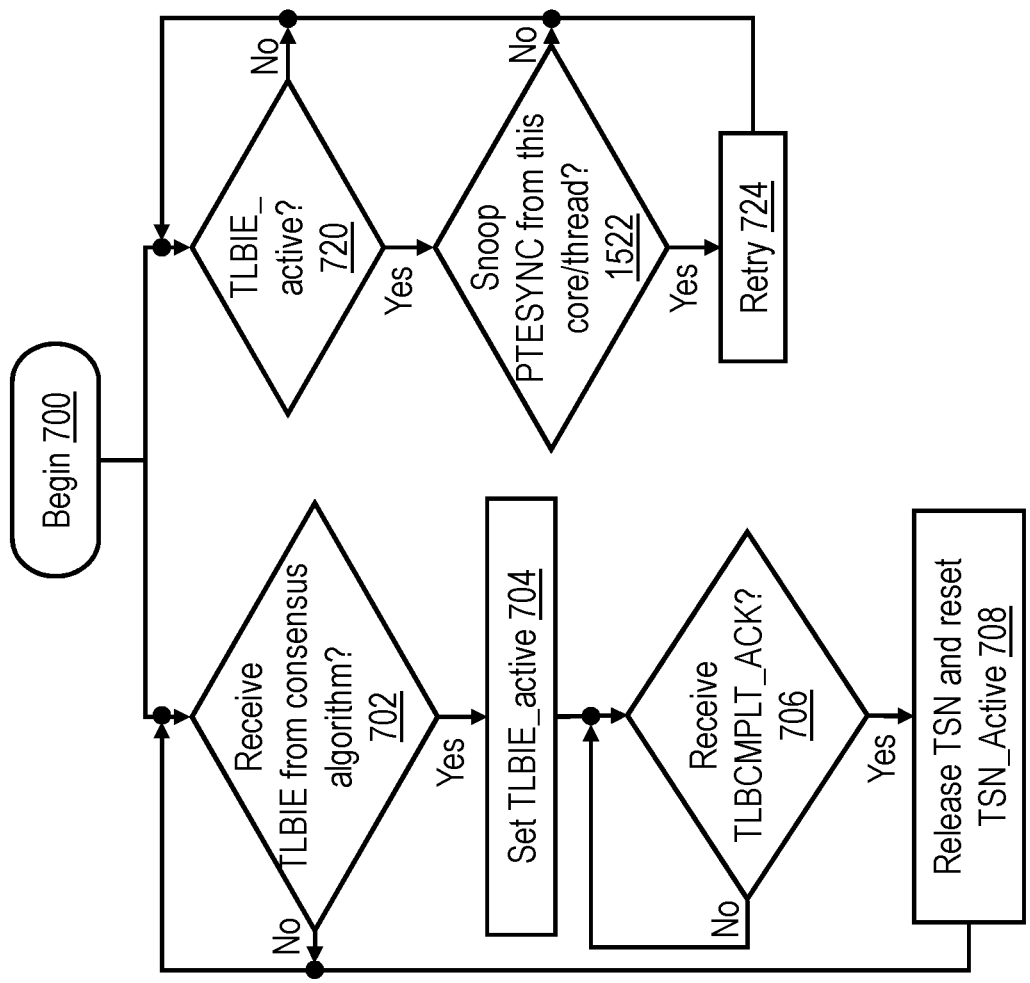
FIG. 15 is a high-level logical flowchart of an exemplary method by which snooper logic of a processing unit processes translation entry invalidation requests, translation invalidation complete requests, and page table synchronization requests in accordance with one embodiment.

With reference now to FIG. 15, there is a high-level logical flowchart of an exemplary method by which TSN machines 346 process TLBIE requests, TLBCMPT_ACK signals, and PTESYNC requests in accordance with one embodiment. As indicated by like reference numerals, FIG. 15 is the same as previously described FIG. 7, except for block 1522. Block 1522 illustrates that while in the TLBIE_active state established at block 704, the TSN machine 346 monitors to determine if a PTESYNC request specifying an initiating processor core and hardware thread matching its TLBIE request has been detected. If not, the process continues to iterate at the loop including blocks 720 and 1522. However, in response to a TSN machine 346 detecting a PTESYNC request specifying a processor core and initiating hardware thread matching its TLBIE request while in the TLBIE_active state, TSN machine 346 provides a Retry coherence response, as indicated at block 724. As discussed above, a Retry coherence response by any TSN machine 346 handling the TLBIE request for the initiating hardware thread forces the PTESYNC request to be retried and prevents the initiating hardware thread from executing any memory referent instructions younger than PTESYNC instruction 430 until the PTESYNC request completes without a Retry coherence response.

As discussed briefly above, avoidance of ping-pong livelocks is a design concern for data processing system interconnect architectures permitting the retrying of multicast requests. In accordance with the disclosed embodiments, ping-pong livelocks can be avoided through the implementation of a central request agent 120 and associated communication protocol for managing the distribution of certain multicast requests subject to retry by snoopers. In the following discussion, an example of a suitable design of a central request agent 120 is described with reference to FIG. 18. The flow of exemplary multicast requests (e.g., TLBIE requests) distributed to snoopers via central request agent 120 in accordance with a first embodiment is then described with reference to FIGS. 19-23. In this first embodiment, it is assumed that the broadcast of a multicast request by an initiating master 1600 requires only a single operation tenure on the system fabric. FIGS. 24-29 depict the flow of multicast requests in a second embodiment in which the broadcast of a multicast request by a master 1600 can require multiple operation tenures on the system fabric.

Figure 18:
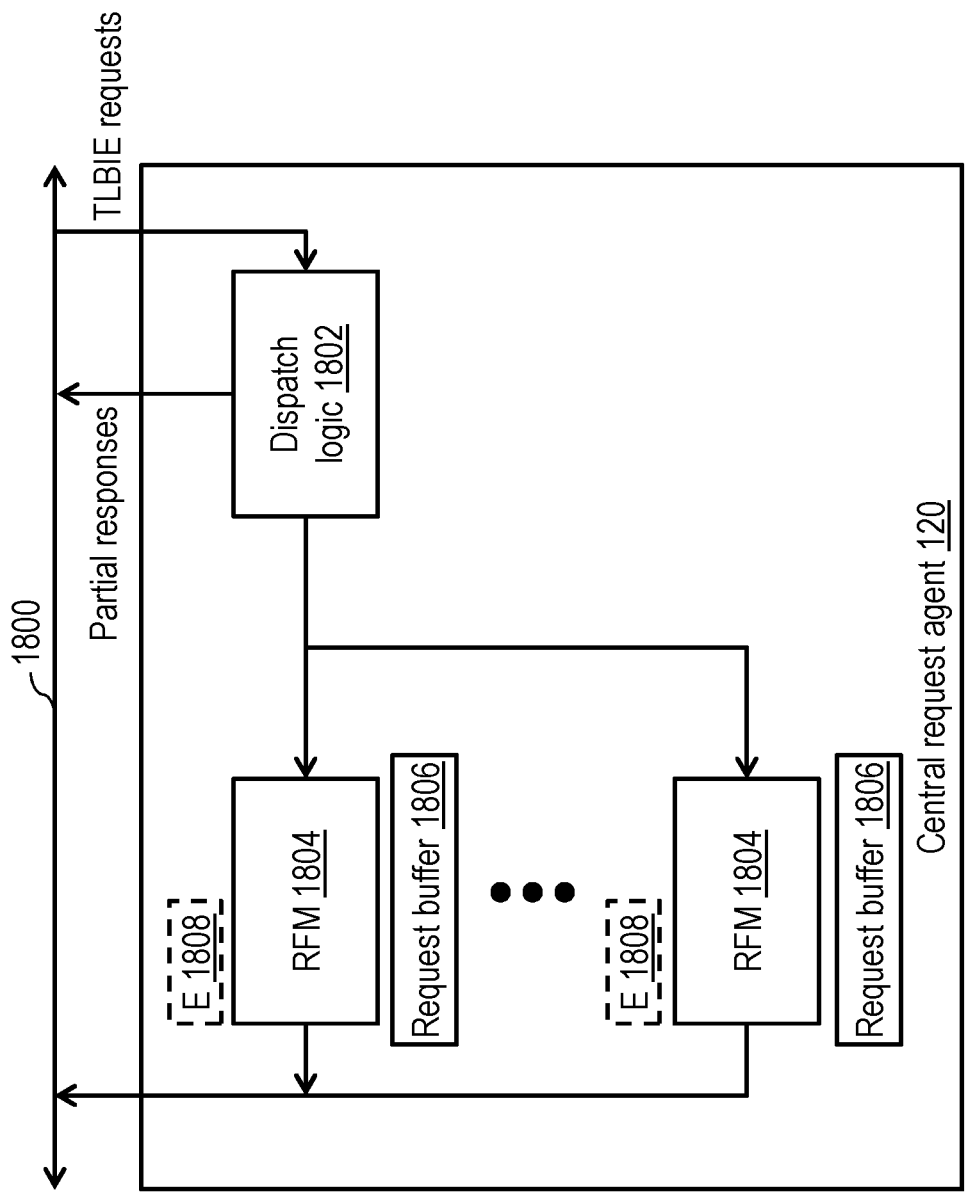
FIG. 18 is a high-level block diagram of an exemplary embodiment of a central request agent in accordance with one embodiment.

Referring now to FIG. 18, there is depicted a high-level block diagram of an exemplary embodiment of a central request agent 120 in accordance with one embodiment. In this example, central request agent 120 includes dispatch logic 1802, which is coupled to receive multicast requests of predetermined transaction types (ttypes) on the system fabric 1800 (which includes system interconnect 110 and local interconnects 114). In some embodiments, these multicast requests include TLBIE requests as previously described; in other embodiments, the multicast requests may include multicast requests of alternative or additional transaction types. Non-multicast requests and multicast requests of other than the predetermined ttypes are ignored by dispatch logic 1802 of central request agent 120.

Central request agent 120 additionally includes a number of request forwarding machines (RFMs) 1804, which manage the forwarding of multicast requests accepted by dispatch logic 1802 to snoopers distributed within data processing system 100. In a preferred embodiment, each snooper relevant for a given ttype of multicast request distributed by central request agent 120 has multiple snoop machines corresponding in number and identifier to those implemented in central request agent 120. Thus, for example, central request agent 120 may implement eight (8) RFMs 1804 for handling distribution of TLBIE requests, meaning that each L2 cache 230 implements eight TSNs 346 each uniquely and respectively corresponding to a respective one of RFMs 1804 and identifiable by a common machine identifier (e.g., which can be specified in RFM ID field 1704 of a forwarded multicast request). Each RFM 1804 has an associated request buffer 1806 for buffering at least the address field 1702, ttype field 1710, and tag field 1720 of a multicast request that it is currently allocated to handle. In some embodiments, each RFM 1804 also has an optional associated epoch indication 1808 (e.g., a single bit) that can be utilized to track a chronological epoch in the operation of data processing system 100.

Figure 19:
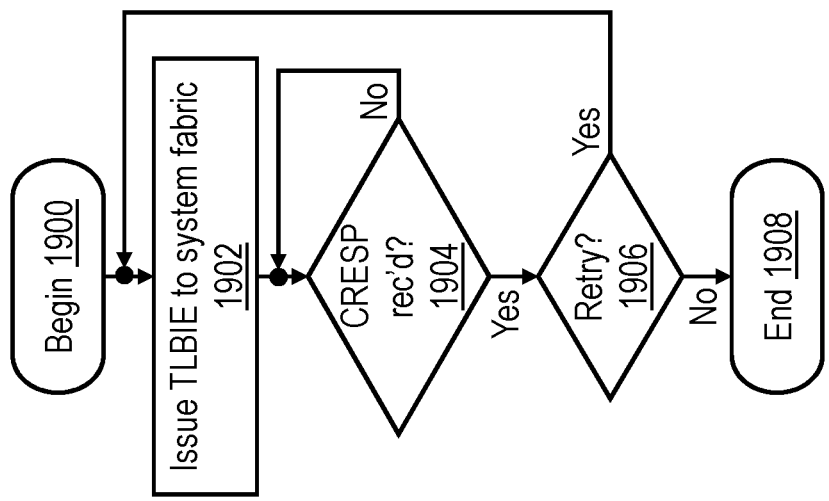
FIG. 19 is a high-level logical flowchart of an exemplary method by which an initiating processing unit or a central request agent issues a translation entry invalidation request in accordance with a first embodiment.

Turning now to FIG. 19, there is illustrated a high-level logical flowchart of an exemplary method by which an initiating processing unit 104 or a central request agent 120 issues a translation entry invalidation request (e.g., TLBIE request) on the system fabric in accordance with a first embodiment. For an initiating processing unit 104, the process is performed by sidecar logic 322 at block 606 of FIG. 6.

Figure 17:
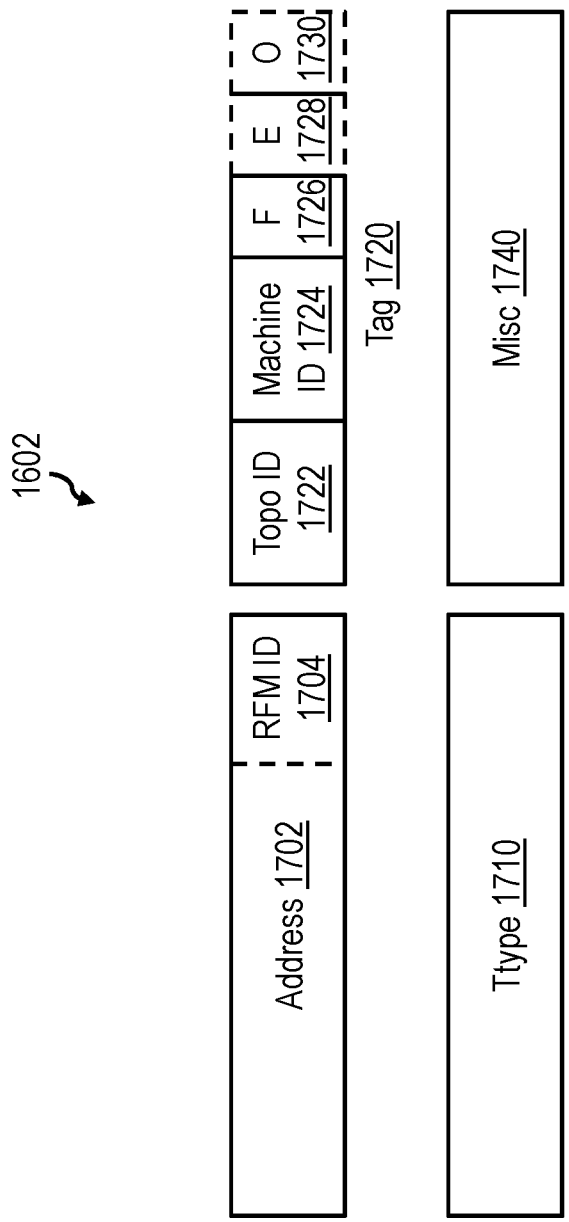
FIG. 17 illustrates an exemplary format of a tag portion of interconnect operation in accordance with one embodiment.

The process of FIG. 19 begins at block 1900 and then proceeds to block 1902, which illustrates a master issuing a TLBIE request having the format given in FIG. 17 to the system fabric 1800. When the TLBIE request is issued by sidecar logic 322 of a processing unit 104, forward (F) field 1726 is reset (e.g., to b'0'); when again issued by central request agent 120 on behalf of the original initiating master, forward field 1726 is set (e.g., to b'1'). As indicated at block 1904, the master monitors for receipt of the Cresp for the TLBIE request issued at block 1902. In response to receipt of the Cresp, the master determines at block 1906 whether the Cresp indicates retry. If so, the process returns block 1902 and following blocks, which illustrates the master reissuing the TLBIE request on system fabric 1800. If, however, the master determines at block 1906 that the Cresp does not indicate retry (i.e., the Cresp indicates success), the process of FIG. 19 ends at block 1908.

As will become apparent from the following discussion, a TLBIE request as originally issued on the system fabric by sidecar logic 322 receives a Cresp indicating retry if central request agent 120 has no RFM 1804 available to handle forwarding of the TLBIE request to the ultimate snoopers (e.g., L2 caches 230). As long as an RFM 1804 is available within central request agent 120 to handle forwarding of the TLB request, no Cresp indicating retry will be provided. However, a TLBIE request as forwarded on the system fabric by a RFM 1804 of central request agent 120 will receive a Cresp indicating retry until all relevant snoopers (e.g., L2 cache 230) have been able to successfully allocate the TSN 346 specified by the TLBIE request to service the TLBIE request.

Figure 20:
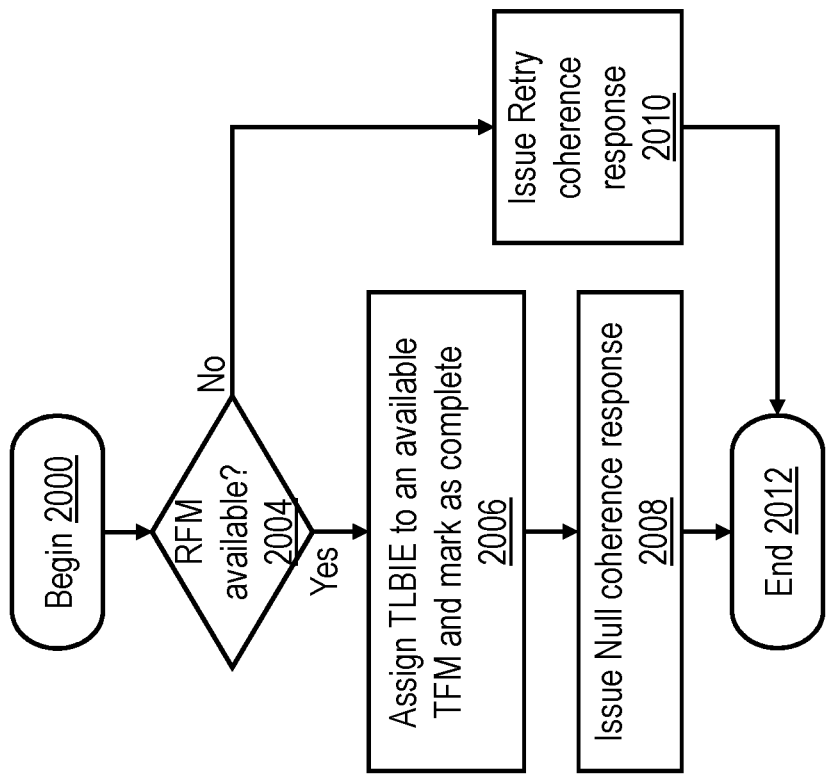
FIG. 20 is a high-level logical flowchart of an exemplary method by which a central request agent receives a translation entry invalidation request from an initiating processing unit in accordance with a first embodiment.

Referring now to FIG. 20, there is a high-level logical flowchart of an exemplary method by which a central request agent 120 receives a translation entry invalidation request (e.g., TLBIE request) from an initiating processing unit 104 in accordance with a first embodiment. The illustrated process is performed for each TLBIE request received by central request agent 120 via the system fabric that has forward (F) field 1726 reset.

The process of FIG. 20 begins at block 2000 in response to receiving a TLBIE request on system fabric 1800 and then proceeds to block 2004, which depicts dispatch logic 1802 determining whether or not a RFM 1804 is available for allocation to handle the TLBIE request. If not, dispatch logic 1802 provides a partial response indicating retry on system fabric 1800 (block 2010). The retry partial response will cause response logic 1622 to generate a Cresp indicating retry, which as discussed above with reference to block 1906 of FIG. 19 will cause the TLBIE request to be reissued on system fabric 1800. If, however, dispatch logic 1802 determines at block 2004 that a RFM 1804 of central request agent 120 is available for allocation to handle the TLBIE request, dispatch logic 1802 assigns the TLBIE request to an available RFM 1804, logs the TLBIE request in the associated request buffer 1806, and marks the TLBIE request as complete (i.e., ready for forwarding) (block 2006). In addition, at block 2008, dispatch logic 1802 provides a null partial response on system fabric 1800, which will allow the TLBIE request to successfully complete without a retry, as discussed above with reference to block 1906 of FIG. 19. Following block 2008 or block 2010, the process of FIG. 20 ends at block 2012.

Figure 21:
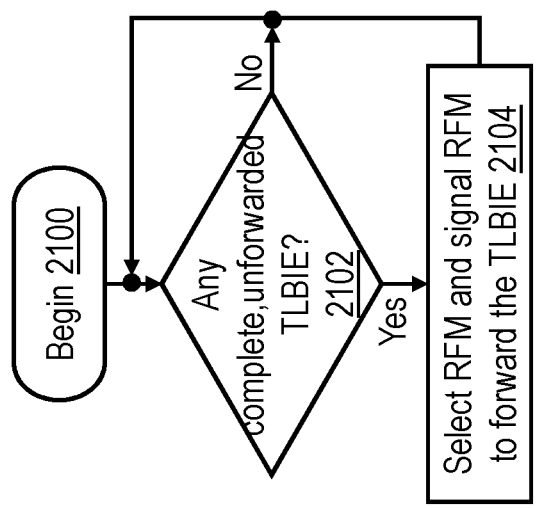
FIG. 21 is a high-level logical flowchart of an exemplary method by which a central request agent selects a translation entry invalidation request for issuance in accordance with a first embodiment.

With reference now to FIG. 21, there is illustrated a high-level logical flowchart of an exemplary method by which a central request agent 120 selects a translation invalidation entry request (e.g., TLBIE request) for issuance in accordance with a first embodiment. The process of FIG. 21 begins at block 2100 and then proceeds to block 2102, which illustrates central request agent 120 determining whether or not any RFM 1804 has been allocated to handle a TLBIE request that is complete, but has not yet been forwarded to the ultimate snoopers. If not, the process simply iterates at block 2102. If, however, central request agent 120 makes an affirmative determination at block 2102, central request agent 120 selects one of the RFM(s) 1804 identified at block 2102 and signals the selected RFM 1804 to forward its TLBIE request on system fabric 1800 utilizing the process of FIG. 22 (block 2104). Following block 2104, the process of FIG. 21 returns to block 2102, which has been described.

Figure 22:
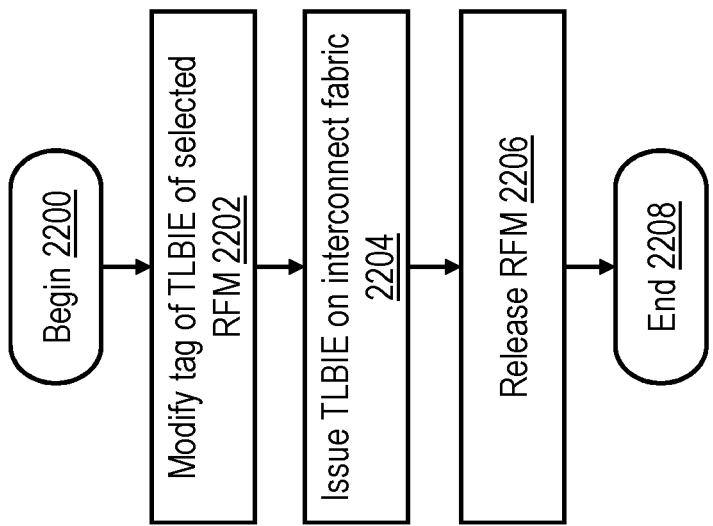
FIG. 22 is a high-level logical flowchart of an exemplary method by which a central request agent issues a translation entry invalidation request in accordance with a first embodiment.

Referring now to FIG. 22, there is depicted a high-level logical flowchart of an exemplary method by which a selected RFM 1804 of central request agent 120 issues a translation entry invalidation request (e.g., TLBIE request) in accordance with a first embodiment. The illustrated process is invoked, for example, at block 2104 of FIG. 21.

The process of FIG. 22 begins at block 2200 and then proceeds to block 2202, which illustrates the selected RFM 1804 modifying the tag 1720 of its buffered TLBIE request by setting the forward field 1726 to indicate the request is being forwarded from central request agent 120. In addition, the RFM 1804 preferably updates the TLBIE request to include its unique RFM identifier (ID). For example, in the embodiment of FIG. 17, the RFM ID can conveniently be specified in the low-order bits of address field 1702, which are unused for TLBIE request since TLBIE requests operate on logical memory pages having a minimum page size of, for example, 4 kB. The selected RFM 1804 then issues (and, if needed, reissues) the modified TLBIE request on the system fabric utilizing the previously described process of FIG. 19 until the TLBIE request is accepted by the TSN 346 in each processing unit 104 corresponding to the specified RFM ID (block 2204). Thereafter, the selected RFM 1804 is released for reallocation (block 2206), and the process of FIG. 22 ends at block 2208.

Figure 23:
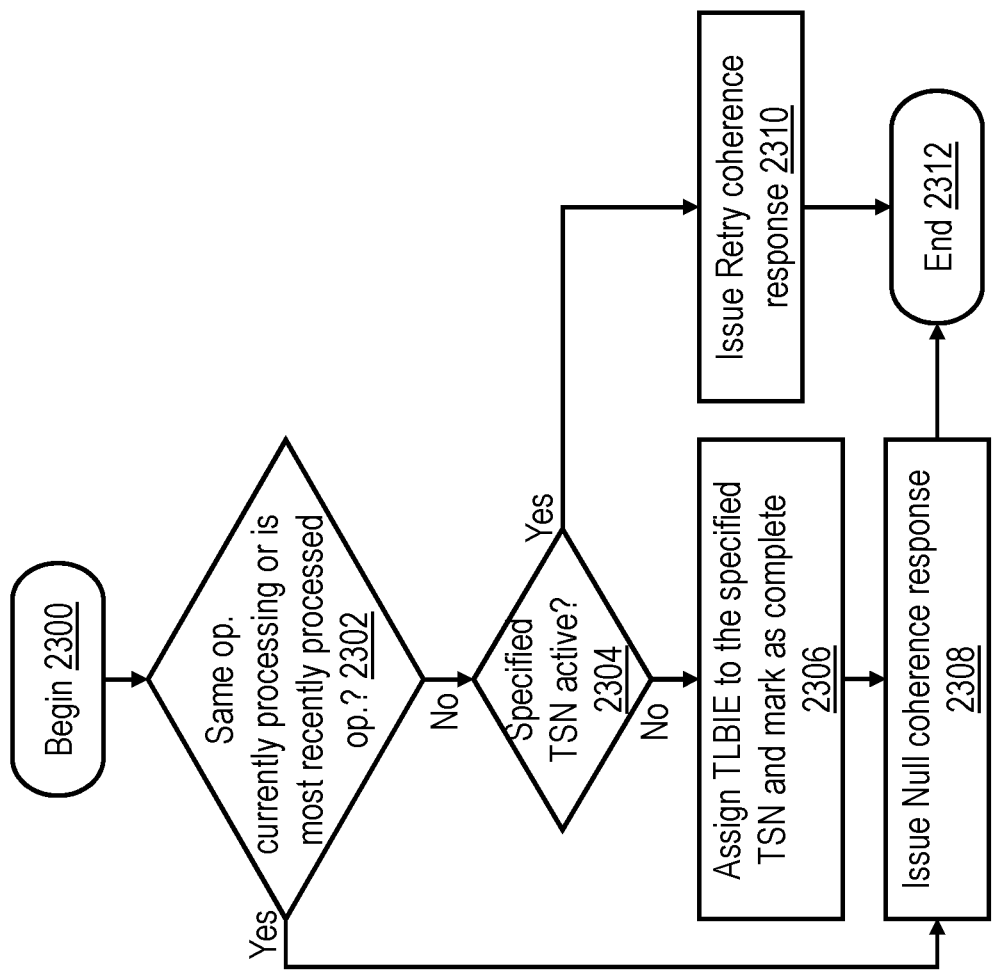
FIG. 23 is a high-level logical flowchart of an exemplary method by which a processing unit receives a translation entry invalidation request from a central request agent in accordance with a first embodiment.

With reference now to FIG. 23, there is illustrated a high-level logical flowchart of an exemplary method by which a processing unit 104 receives a translation entry invalidation request (e.g., TLBIE request) from a central request agent 120 in accordance with a first embodiment. The illustrated process is performed by a processing unit 104 for each snooped TLBIE request having forward field 1726 set to indicate central request agent 120 as the initiating master. Other requests are simply ignored by the depicted process.

The process of FIG. 23 begins at block 2300 in response to a processing unit 104 snooping a TLBIE request issued by central request agent 120 and then proceeds to block 2302, which illustrates the processing unit 104 determining whether or not the TLBIE request is the same request as one currently being processed or that was most recently processed by the TSN 346 corresponding to the RFM ID 1704 specified in the TLBIE request. In response to an affirmative determination at block 2302, the process passes to block 2308, which is described below. If, however, the processing unit 104 makes a negative determination at block 2302, the processing unit 104 additionally determines at block 2304 whether or not the specified TSN 346 (i.e., the TSN 346 corresponding to the RFM ID 1704) is currently active, meaning that the specified TSN 346 is still busy working on a previously received TLBIE request. In response to an affirmative determination at block 2304, the processing unit 104 issues a retry partial response on system fabric 1800, which will cause generation of a retry Cresp that will cause central request agent 120 to reissue the TLBIE request (block 2310).

Returning to block 2304, in response to a determination that the specified TSN 346 is not currently active, the processing unit 104 assigns the TLBIE request to the specified TSN 346 for handling and marks the TLBIE request as complete (i.e., ready for processing by the TSN 346) (block 2306). The step shown at block 2306 causes the TSN 346 to set TLBIE_active, as discussed above at blocks 702-704 of FIG. 7, and to forward the TLBIE request to the associated processor core 200, as discussed above at blocks 802-804 of FIG. 8. The process of FIG. 23 then passes to block 2308, which illustrates the processing unit 104 issuing a null partial response on system fabric 1800. Following block 2308 or 2310, the process of FIG. 23 ends at block 2312.

In the process of FIG. 23 (and similar FIG. 28 below), the processing unit 104 can safely provide null partial responses to previously snooped TLBIE requests re-issued on system fabric 1800 because central request agent 120 is constructed to not send a new TLBIE request from a given RFM 1804 until central request agent 120 receives a successful (i.e., non-retry) Cresp for the prior TLBIE request, where the successful Cresp signifies that the prior TLBIE request has been accepted by all relevant processing units 104. Any TSN 346 completing processing on a given TLBIE request earlier than corresponding TSN(s) 346 in other processing units 104 will simply remain idle waiting for the other TSN(s) to complete their processing of the TLBIE request and allowing a new TLBIE request to be issued by the corresponding RFM 1804.

In the description of the first embodiment with reference to FIGS. 19-23, it is tacitly assumed that a multicast request (e.g., a TLBIE request) can be transmitted via system fabric 1800 in a single operation tenure. In some implementations, this is not the case for all multicast requests given the relative sizes of the multicast requests versus the width of system fabric 1800. The disclosed technique of utilizing a central request agent to distribute a multicast request can, however, be extended for use in such environments, as now described with reference to the second embodiment given in FIG. 24 and following. In the second embodiment, exemplary multicast requests include those that require only a single operation tenure (referred to as TLBIE_OP1_Only) and those that require two operation tenures (referred to as TLBIE_OP1 and TLBIE_OP2).

Figure 24:
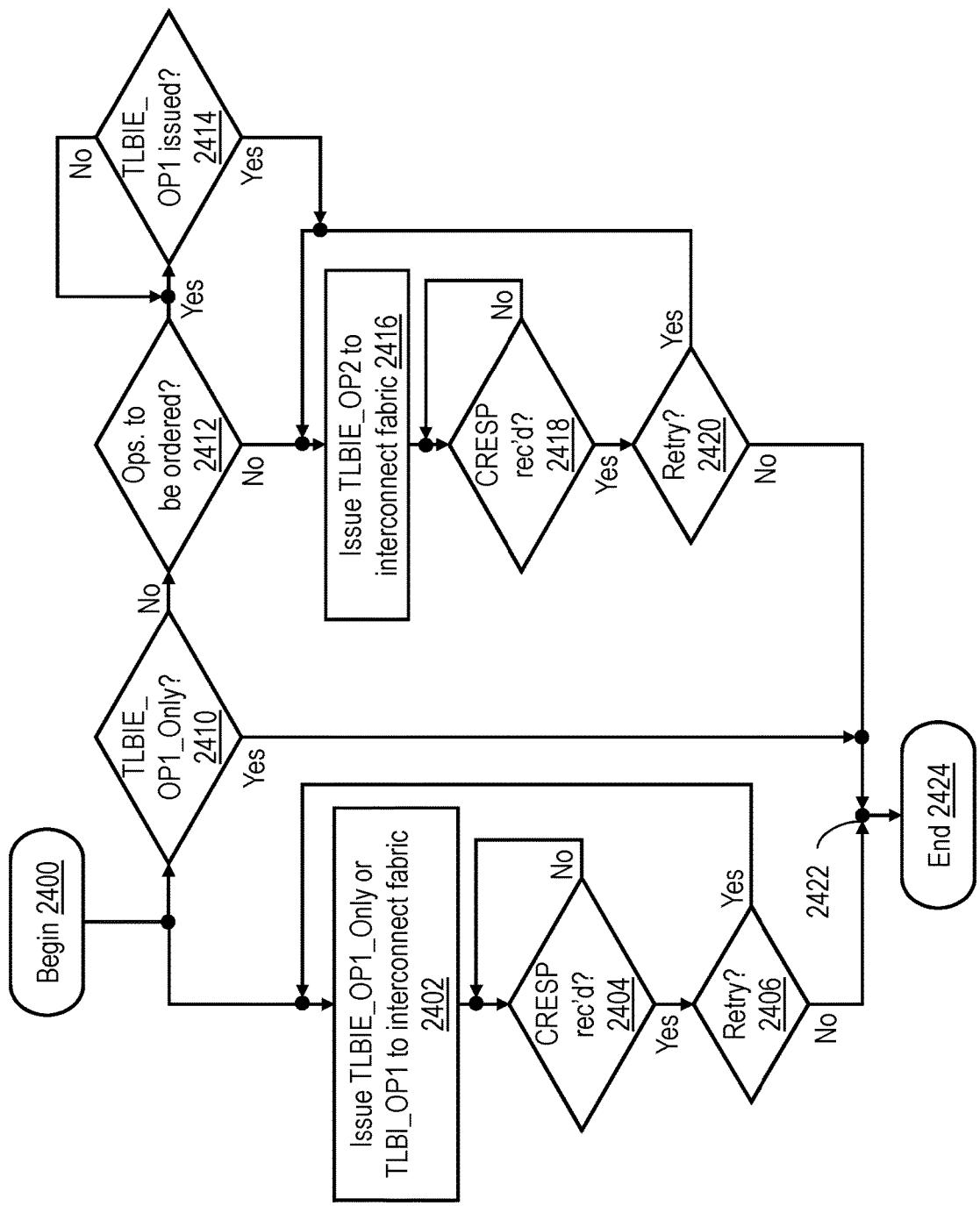
FIG. 24 is a high-level logical flowchart of an exemplary method by which an initiating processing unit or a central request agent issues a translation entry invalidation request in accordance with a second embodiment.

Referring now to FIG. 24, there is depicted a high-level logical flowchart of an exemplary method by which an initiating processing unit 104 or a central request agent 120 issues a translation entry invalidation request (e.g., TLBIE request) in accordance with a second embodiment. For an initiating processing unit 104, the process of FIG. 24 is performed by sidecar logic 322 at block 606 of FIG. 6.

The process of FIG. 24 begins at block 2400 and then proceeds in parallel to blocks 2402 and 2410. Block 2402 illustrates the master issuing on the system fabric a TLBIE_OP1_Only request or a TLBIE_OP1 request having the format given in FIG. 17. When issued by sidecar logic 322 of a processing unit 104, forward (F) field 1726 is reset (e.g., to b'0'); when again issued by central request agent 120 on behalf of the original initiating master, forward field 1726 is set (e.g., to b'1'). As indicated at block 2404, the master monitors for receipt of the Cresp for the multicast request issued at block 2402. In response to receipt of the Cresp, the master determines at block 2406 whether the Cresp indicates retry. If so, the process returns block 2402 and following blocks, which illustrates the master reissuing the TLBIE_OP1_Only and TLBIE_OP1 request. If, however, the master determines at block 2406 that the Cresp does not indicate retry but instead indicates success, the process of FIG. 24 proceeds to join point 2422.

Referring now to block 2410, the master additionally determines whether the transaction type of the multicast request indicates that only a single operation tenure is required. In various implementations, this information can be conveyed, for example, in ttype field 1710 or in operation (O) field 1730. In response to an affirmative determination at block 2410, the process passes to join point 2422. If, however, the master makes a negative determination at block 2410, meaning that a TLBIE request includes both a TLBIE_OP1 request and a TLBIE_OP2 request, the master handles the multiple operation tenures of the multicast request in accordance with implementation-dependent ordering requirements, if any. That is, if a given implementation requires a TLBIE_OP1 request to be issued prior to the corresponding TLBIE_OP2 request, as indicated by an affirmative determination at block 2412, the master defers issuance of the TLBIE_OP2 request until the handling of the TLBIE_OP1 request has reached join point 2422 (block 2414). If, however, a given implementation does not require a TLBIE_OP1 request to be issued prior to the corresponding TLBIE_OP2 request, as indicated by negative result at block 2412, the master issues a TLBIE_OP2 request on the system fabric independently of the timing of the issuance of the corresponding TLBIE_OP1 request (block 2416). As noted above, when issued by sidecar logic 322, forward (F) field 1726 is reset (e.g., to b'0'), and when again issued by central request agent 120 on behalf of the original initiating master, forward field 1726 is set (e.g., to b'1'). As indicated at block 2418, the master monitors for receipt of the Cresp for the TLBIE_OP2 request issued at block 2416. In response to receipt of the Cresp, the master determines at block 2420 whether the Cresp indicates retry. If so, the process returns block 2416 and following blocks, which illustrates the master reissuing the TLBIE_OP2 request. If, however, the master determines at block 2420 that the Cresp does not indicate retry, the process of FIG. 24 proceeds to join point 2422. Once both legs of the process have reached join point 2422, the process of FIG. 24 ends at block 2424.

As discussed above with reference to FIG. 19, a TLBIE_OP1_Only, TLBIE_OP1, or TLBIE_OP2 request as originally issued on the system fabric by sidecar logic 322 receives a Cresp indicating retry only if central request agent 120 has no RFM 1804 available to handle forwarding of the multicast request to the ultimate snoopers (e.g., L2 caches 230). As long as an RFM 1804 is available within central request agent 120 to handle forwarding of the TLBIE request, a successful Cresp will be provided. However, a multicast request as forwarded on the system fabric by a RFM 1804 of central request agent 120 will receive a Cresp indicating retry until all relevant snoopers (e.g., L2 cache 230) have been able to successfully receive the multicast request and allocate the specified TSN 346 to handle it.

Figure 25:
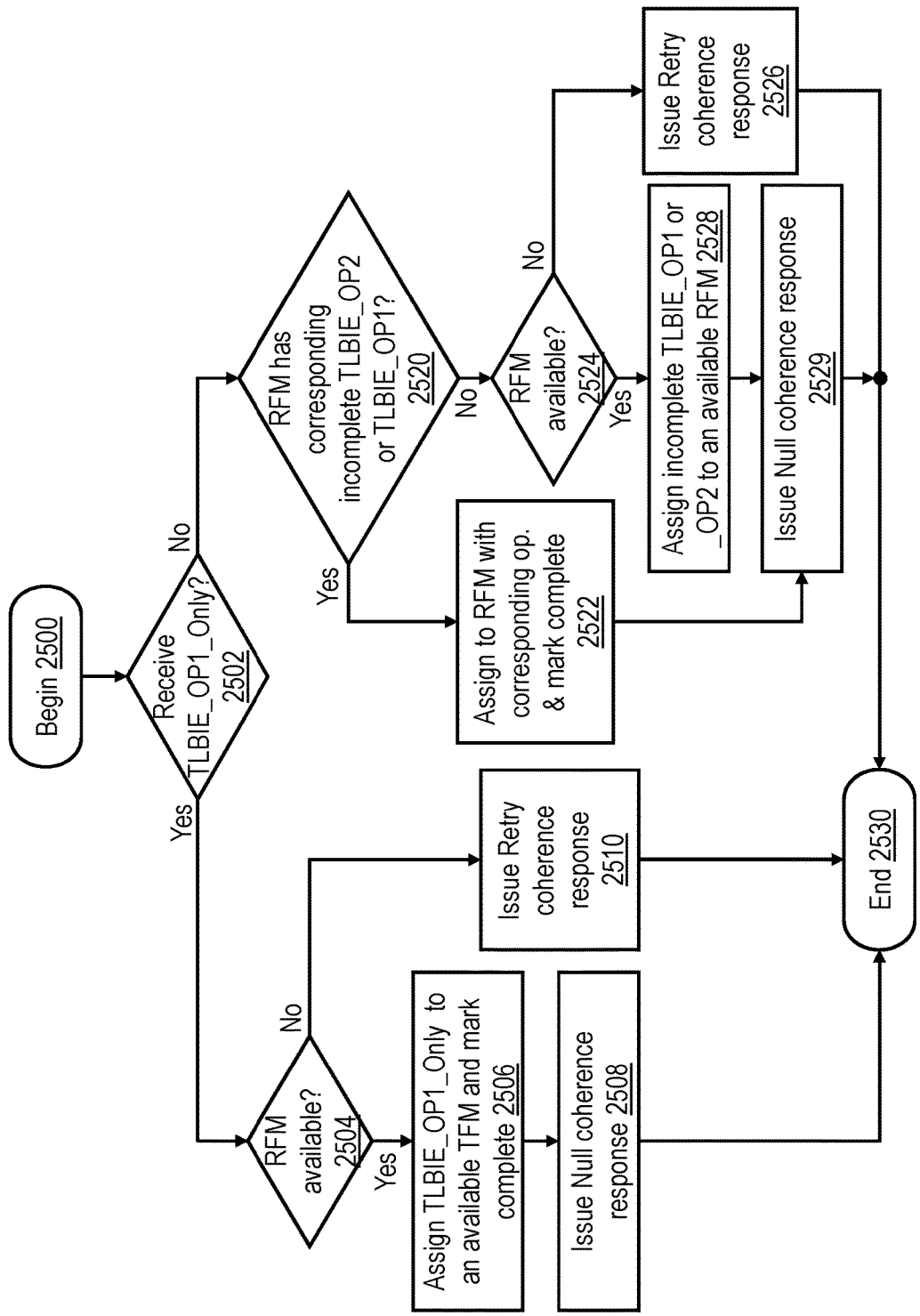
FIG. 25 is a high-level logical flowchart of an exemplary method by which a central request agent receives a translation entry invalidation request from an initiating processing unit in accordance with a second embodiment.

With reference now to FIG. 25, there is illustrated a high-level logical flowchart of an exemplary method by which a central request agent 120 receives a translation entry invalidation request (e.g., TLBIE_OP1_Only, TLBIE_OP1 or TLBIE_OP2 request) from an initiating processing unit 104 in accordance with a second embodiment. The illustrated process is performed for each TLBIE_OP1_Only, TLBIE_OP1 or TLBIE_OP2 request received by central request agent 120 via system fabric 1800 that has its forward (F) field 1726 reset. Other types of requests are simply ignored by central request agent 120.

The process of FIG. 25 begins at block 2500 in response to central request agent 120 receiving a TLBIE_OP1_Only, TLBIE_OP1 or TLBIE_OP2 request on system fabric 1800. The process then proceeds from block 2500 to block 2502, which depicts dispatch logic 1802 determining whether the received request is a TLBIE_OP1_Only request. In response to an affirmative determination at block 2502, the process proceeds to block 2504 and following blocks. In response to a negative determination at block 2502, meaning the received request is a TLBIE_OP1 or TLBIE_OP2 request, the process passes to block 2520 and following blocks.

Referring to the block 2504, dispatch logic 1802 determines whether or not an RFM 1804 is currently available for allocation to handle the TLBIE_OP1_Only request. If not, dispatch logic 1802 provides a partial response indicating retry on system fabric 1800 (block 2510). The retry partial response will cause response logic 1622 to generate a Cresp indicating retry, which as depicted at block 2406 of FIG. 24 will cause the TLBIE_OP1_Only request to be reissued on system fabric 1800. If, however, dispatch logic 1802 determines at block 2504 that at least one RFM 1804 of central request agent 120 is available for allocation to handle the TLBIE_OP1_Only request, dispatch logic 1802 assigns the TLBIE_OP1_Only request to an available RFM 1804, logs the TLBIE_OP1_Only request in the associated request buffer 1806, and marks the TLBIE_OP1_Only request as complete (i.e., ready for forwarding) (block 2506). In addition, at block 2508, dispatch logic 1802 provides a null partial response on system fabric 1800, which will allow the TLBIE_OP1_Only request to complete without a retry, as discussed above with reference to block 2406 of FIG. 24. Following block 2508 or block 2510, the process of FIG. 25 ends at block 2530.

Referring now to block 2520, dispatch logic 1802 determines whether or not any RFM 1804 holds in its request buffer 1806 an incomplete TLBIE_OP2 or TLBIE_OP1 corresponding to the TLBIE_OP1 or TLBIE_OP2 request, respectively, received via system fabric 1800. The corresponding request will have a matching tag 1720, except with operation type field 1730 set to indicate the other type of request (e.g., TLBIE_OP1 or TLBIE_OP2). In response to an affirmative determination at block 2520, dispatch logic 1802 assigns the received TLBIE_OP1 or TLBIE_OP2 request received at block 2502 to the RFM 1804 buffering the corresponding TLBIE_OP2 or TLBIE_OP1 request and marks both the TLBIE_OP1 and TLBIE_OP2 requests as complete (block 2522). Thereafter, the process passes to block 2529, which is described below.

Returning to block 2520, in response to a determination that no RFM 1804 is currently buffering an incomplete TLBIE_OP2 or TLBIE_OP1 corresponding to the TLBIE_OP1 or TLBIE_OP2 request received via system fabric 1800, dispatch logic 1802 determines at block 2524 whether or not an RFM 1804 is available for allocation to handle the TLBIE_OP1 or TLBIE_OP2 request. If not, dispatch logic 1802 provides a partial response indicating retry on system fabric 1800 (block 2526). The retry partial response will cause response logic 1622 to generate a Cresp indicating retry, which as depicted at block 2406 or block 2420 of FIG. 24 will cause the TLBIE_OP1 or TLBIE_OP2 request to be reissued on system fabric 1800. If, however, dispatch logic 1802 determines at block 2524 that a RFM 1804 of central request agent 120 is available for allocation to handle the received TLBIE_OP1 or TLBIE_OP2 request, dispatch logic 1802 assigns the TLBIE_OP1 or TLBIE_OP2 request to an available RFM 1804 and logs the request in the associated request buffer 1806 (block 2528). In addition, at block 2529, dispatch logic 1802 provides a null partial response on system fabric 1800, which will allow the TLBIE_OP1 or TLBIE_OP2 request to complete without a retry, as discussed above with reference to block 2406 or block 2420 of FIG. 24. Following block 2526 or block 2529, the process of FIG. 25 ends at block 2530.

Figure 26:
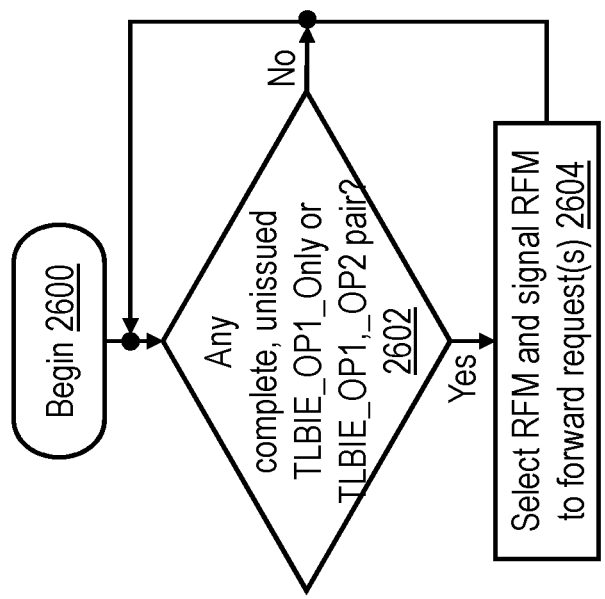
FIG. 26 is a high-level logical flowchart of an exemplary method by which a central request agent selects a translation entry invalidation request for issuance in accordance with a second embodiment.

Referring now to FIG. 26, there is depicted a high-level logical flowchart of an exemplary method by which a central request agent 120 selects a translation entry invalidation request (e.g., TLBIE_OP1_Only or TLBIE_OP1/TLBIE_OP2 request) for issuance in accordance with a second embodiment. The process of FIG. 26 begins at block 2600 and then proceeds to block 2602, which illustrates central request agent 120 determining whether or not any RFM 1804 has been allocated to handle a multicast request (e.g., TLBIE_OP1_Only or TLBIE_OP1/TLBIE_OP2 request) that is complete, but has not yet been forwarded to the ultimate snoopers. If not, the process simply iterates at block 2602. If, however, central request agent 120 makes an affirmative determination at block 2602, central request agent 120 selects one of the RFM(s) 1804 identified at block 2602 and signals the selected RFM 1804 to forward its multicast request(s) on the system fabric in accordance with the process of FIG. 27 (block 2604). Following block 2604, the process of FIG. 26 returns to block 2602, which has been described.

Figure 27:
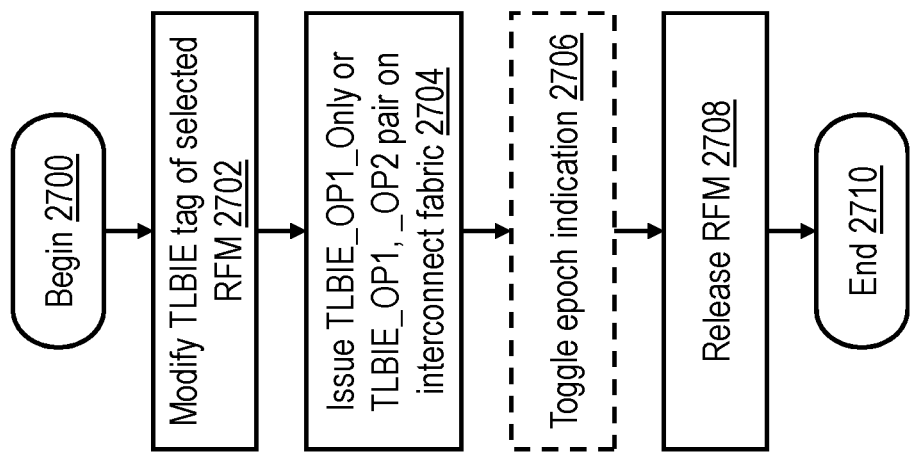
FIG. 27 is a high-level logical flowchart of an exemplary method by which a central request agent issues a translation entry invalidation request in accordance with a second embodiment.

With reference now to FIG. 27, there is illustrated a high-level logical flowchart of an exemplary method by which a central request agent issues a translation entry invalidation request on system fabric 1800 in accordance with a second embodiment. The illustrated process is invoked, for example, at block 2604 of FIG. 26.

The process of FIG. 27 begins at block 2700 and then proceeds to block 2702, which illustrates the selected RFM 1804 modifying the tag 1720 of a buffered TLBIE_OP1_only, TLBIE_OP1, or TLBIE_OP2 request to be forwarded by setting the forward field 1726 to indicate central request agent 120 as the source. In addition, the RFM 1804 preferably updates the TLBIE_OP1_only, TLBIE_OP1, or TLBIE_OP2 request to include its unique RFM ID 1704, for example, in the low-order bits of address field 1702. If epoch indications 1808 are implemented central request agent 120, the selected RFM 1804 also configures epoch field 1728 of tag 1720 with the value of its associated epoch indication 1808. Following the tag modification depicted at block 2702, the selected RFM 1804 then issues (and, if needed, reissues) the modified multicast request on system fabric 1800 utilizing the previously described process of FIG. 24 until the multicast request is accepted by the TSN 346 in each processing unit 104 corresponding to the specified RFM ID 1704 (block 2704). At optional block 2706, the selected RFM 1804 toggles the value of its associated epoch indication 1808. Updating epoch indication 1808 at least between issuing each pair of TLBIE_OP1 and TLBIE_OP2 requests enables processing units 104, which can be powered off and powered on asynchronously to the issuance of multicast requests, to detect whether snooped TLBIE_OP1 and TLBIE_OP2 form a corresponding pair. Following block 2704 or optional block 2706, if present, the selected RFM 1804 is released for reallocation (block 2708), and the process of FIG. 27 ends at block 2710.

Figure 28:
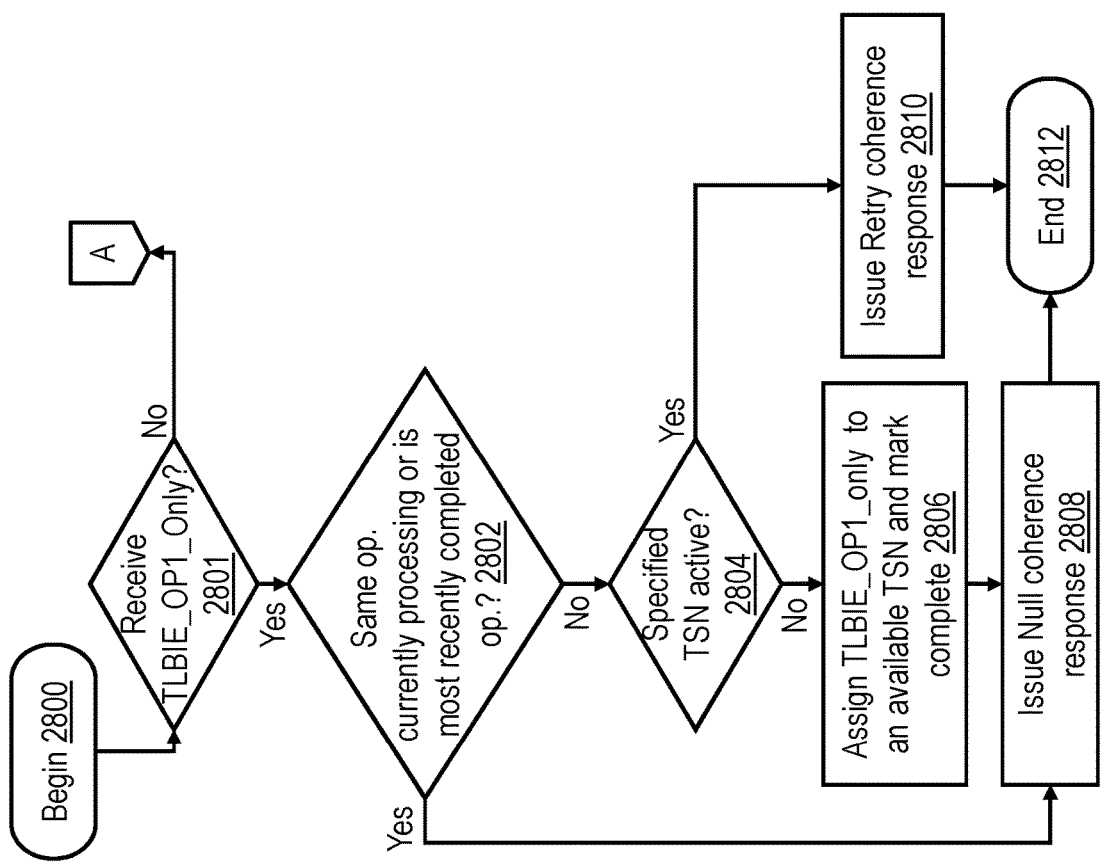
FIGS. 28-29 together form a high-level logical flowchart of an exemplary method by which a processing unit receives a translation entry invalidation request for processing in accordance with a second embodiment.
Figure 29:
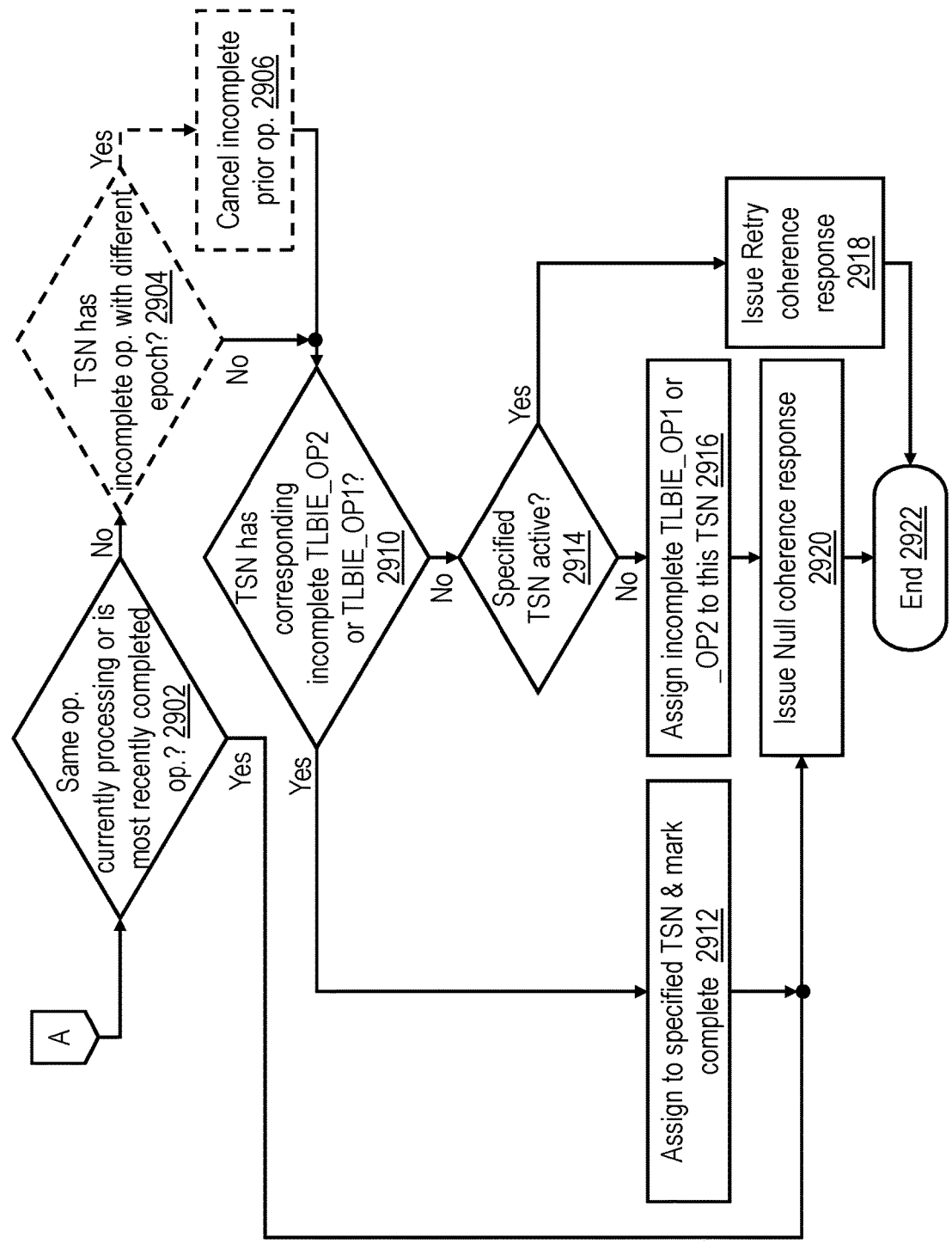

Referring now to FIGS. 28-29, there is depicted a high-level logical flowchart of an exemplary method by which a processing unit 104 receives a translation entry invalidation request (e.g., TLBIE_OP1_Only, TLBIE_OP1, or TLBIE_OP2) for processing in accordance with a second embodiment. The illustrated process is performed by each processing unit 104 for each snooped TLBIE_OP1_Only, TLBIE_OP1, or TLBIE_OP2 request having forward field 1726 set in its tag 1720 to indicate central request agent 120 as the initiating master. Other requests are simply ignored by the process of FIGS. 28-29.

The process of FIG. 28 begins at block 2800 in response to a processing unit 104 snooping a TLBIE_OP1_Only, TLBIE_OP1, or TLBIE_OP2 request issued by central request agent 120. The process then proceeds to block 2801, which illustrates the processing unit 104 determining whether or not the snooped request is a TLBIE_OP1_Only request. If so, the process proceeds to block 2802 of FIG. 28 and following blocks; if not, meaning that the snooped request is a TLBIE_OP1 or TLBIE_OP2 request, the process passes through page connector A to block 2902 of FIG. 29 and following blocks.

Referring now to block 2802, the processing unit 104 determines whether or not the snooped TLBIE_OP1_Only request is the same request as that currently being processed or that was most recently processed by the TSN 346 corresponding to the RFM ID 1704 specified in the snooped request. In response to an affirmative determination at block 2802, the process passes to block 2808, which is described below. If, however, the processing unit 104 makes a negative determination at block 2802, the processing unit 104 additionally determines at block 2804 whether or not the TSN 346 corresponding to the specified RFM ID 1704 is currently active, meaning that the specified TSN 346 is still busy working on a previously snooped multicast request. In response to an affirmative determination at block 2804, the processing unit 104 issues a retry partial response on system fabric 1800, which will cause generation of a retry Cresp that will cause central request agent 120 to reissue the TLBIE_OP1_Only request (block 2810).

Returning to block 2804, in response to a determination that the TSN 346 corresponding to the RFM ID 1704 specified in the snooped TLBIE_OP1_Only request is not currently active, the processing unit 104 assigns the snooped TLBIE_OP1_Only request to the specified TSN 346 for handling and marks the TLBIE_OP1_Only request as complete (i.e., ready for processing by the TSN 346) (block 2806). The step shown at block 2806 causes the TSN 346 to set TLBIE_active, as discussed above at blocks 702-704 of FIG. 7, and to forward the TLBIE_OP1_Only request to the associated processor core 200, as discussed above at blocks 802-804 of FIG. 8. The process of FIG. 28 then passes to block 2808, which illustrates the processing unit 104 issuing a null partial response on system fabric 1800. Following block 2808 or 2810, the process of FIG. 28 ends at block 2812.

With reference now to block 2902 of FIG. 29, the processing unit 104 determines whether or not the snooped TLBIE_OP1 or TLBIE_OP2 request is the same request as that currently being processed or that was most recently processed by the TSN 346 corresponding to the RFM ID 1704 specified in the snooped request. If the use of epochs is implemented, the determination made at block 2902 includes a determination of whether the epoch field 1728 of the snooped request matches the epoch field 1728 of the currently processing or immediately previously processed request. In response to an affirmative determination at block 2902, the process passes to block 2920, which is described below. If, however, the processing unit 104 makes a negative determination at block 2902, the snooping processing unit 104 optionally additionally determines at block 2904 whether or not the specified TSN 346 is currently allocated an incomplete request specifying a different epoch than specified in epoch field 1728 of the snooped request. In response to an affirmative determination at block 2904, the processing unit 104 cancels the incomplete prior multicast request and discards it from the specified TSN 346 (block 2906). Following block 2906 or a negative determination at block 2904, the process proceeds to block 2910.

Block 2910 depicts the processing unit 104 determining whether or not the TSN 346 corresponding to the specified RFM ID 1704 is currently assigned an incomplete TLBIE_OP2 or TLBIE_OP1 corresponding to the TLBIE_OP1 or TLBIE_OP2 request, respectively, snooped via system fabric 1800. The corresponding request will have a matching tag 1720, except with operation type field 1730 set to indicate the other type of request (e.g., TLBIE_OP1 or TLBIE_OP2). In response to an affirmative determination at block 2910, the processing unit 104 assigns the snooped TLBIE_OP2 or TLBIE_OP1 to the specified TSN 346 and marks the TLBIE_OP1 and TLBIE_OP2 requests as complete and thus ready for processing by TSN 346 (block 2912). Marking the TLBIE_OP1 and TLBIE_OP2 requests as shown at block 2912 causes the TSN 346 to set TLBIE_active, as discussed above at blocks 702-704 of FIG. 7, and to forward the TLBIE_OP1 and TLBIE_OP2 requests to the associated processor core 200, as discussed above at blocks 802-804 of FIG. 8. The process then passes to block 2920, which is described below.

Returning to block 2910, in response to a negative determination, the process proceeds to block 2914, which illustrates the processing unit 104 determining whether or not the specified TSN 346 is active, meaning that the specified TSN 346 is still busy working on a previously snooped request. In response to an affirmative determination at block 2914, the processing unit 104 issues a retry partial response on system fabric 1800, which will cause generation of a retry Cresp that will cause central request agent 120 to reissue the TLBIE_OP1 or TLBIE_OP2 request, as described above with reference to blocks 2406 and 2420 of FIG. 24 (block 2918).

Returning to block 2914, in response to a determination that the specified TSN 346 is not currently active, the processing unit 104 assigns the snooped TLBIE_OP1 or TLBIE_OP2 request to the specified TSN 346 for handling and marks the request as incomplete (block 2916). The process of FIG. 29 then passes to block 2920, which illustrates the processing unit 104 issuing a null partial response on system fabric 1800. Following block 2918 or 2820, the process of FIG. 29 ends at block 2922.

Figure 30:
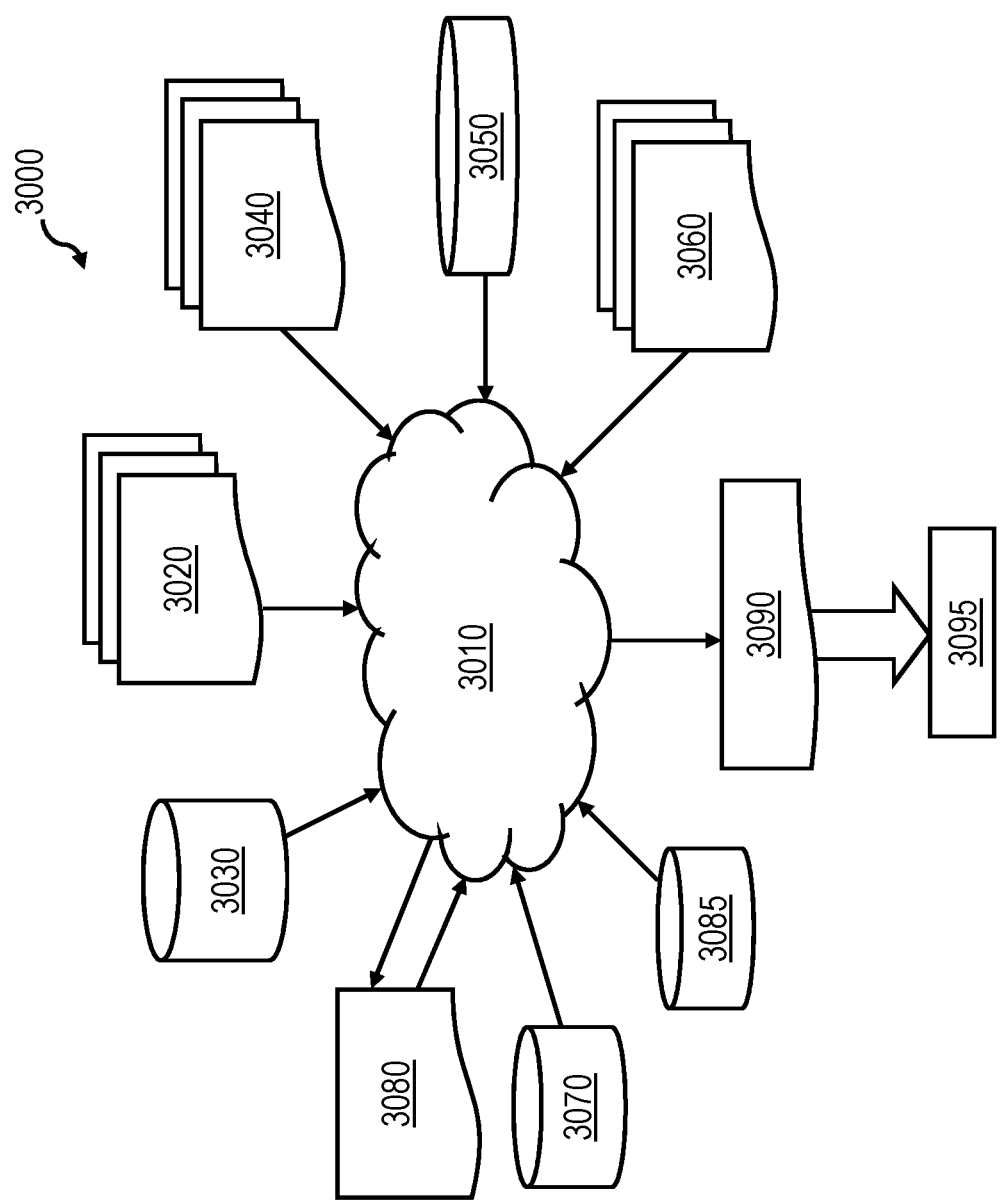
FIG. 30 is a data flow diagram illustrating a design process.

With reference now to FIG. 30, there is depicted a block diagram of an exemplary design flow 3000 used for example, in semiconductor IC logic design, simulation, test, layout, and manufacture. Design flow 3000 includes processes, machines and/or mechanisms for processing design structures or devices to generate logically or otherwise functionally equivalent representations of the design structures and/or devices described above. The design structures processed and/or generated by design flow 3000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 3000 may vary depending on the type of representation being designed. For example, a design flow 3000 for building an application specific IC (ASIC) may differ from a design flow 3000 for designing a standard component or from a design flow 3000 for instantiating the design into a programmable array, for example a programmable gate array (PGA) or a field programmable gate array (FPGA) offered by Altera® Inc. or Xilinx® Inc.

FIG. 30 illustrates multiple such design structures including an input design structure 3020 that is preferably processed by a design process 3010. Design structure 3020 may be a logical simulation design structure generated and processed by design process 3010 to produce a logically equivalent functional representation of a hardware device. Design structure 3020 may also or alternatively comprise data and/or program instructions that when processed by design process 3010, generate a functional representation of the physical structure of a hardware device. Whether representing functional and/or structural design features, design structure 3020 may be generated using electronic computer-aided design (ECAD) such as implemented by a core developer/designer. When encoded on a machine-readable data transmission, gate array, or storage medium, design structure 3020 may be accessed and processed by one or more hardware and/or software modules within design process 3010 to simulate or otherwise functionally represent an electronic component, circuit, electronic or logic module, apparatus, device, or system such as those shown herein. As such, design structure 3020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 3010 preferably employs and incorporates hardware and/or software modules for synthesizing, translating, or otherwise processing a design/simulation functional equivalent of the components, circuits, devices, or logic structures shown herein to generate a netlist 3080 which may contain design structures such as design structure 3020. Netlist 3080 may comprise, for example, compiled or otherwise processed data structures representing a list of wires, discrete components, logic gates, control circuits, I/O devices, models, etc. that describes the connections to other elements and circuits in an integrated circuit design. Netlist 3080 may be synthesized using an iterative process in which netlist 3080 is resynthesized one or more times depending on design specifications and parameters for the device. As with other design structure types described herein, netlist 3080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 3010 may include hardware and software modules for processing a variety of input data structure types including netlist 3080. Such data structure types may reside, for example, within library elements 3030 and include a set of commonly used elements, circuits, and devices, including models, layouts, and symbolic representations, for a given manufacturing technology (e.g., different technology nodes, 30 nm, 45 nm, 90 nm, etc.). The data structure types may further include design specifications 3040, characterization data 3050, verification data 3060, design rules 3070, and test data files 3085 which may include input test patterns, output test results, and other testing information. Design process 3010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 3010 without deviating from the scope and spirit of the invention. Design process 3010 may also include modules for performing standard circuit design processes such as timing analysis, verification, design rule checking, place and route operations, etc.

Design process 3010 employs and incorporates logic and physical design tools such as HDL compilers and simulation model build tools to process design structure 3020 together with some or all of the depicted supporting data structures along with any additional mechanical design or data (if applicable), to generate a second design structure 3090. Design structure 3090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 3020, design structure 3090 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 3090 may comprise a compiled, executable HDL simulation model that functionally simulates one or more of the devices shown herein.

Design structure 3090 may also employ a data format used for the exchange of layout data of integrated circuits and/or symbolic data format (e.g., information stored in a GDSII (GDS2), GL1, OASIS, map files, or any other suitable format for storing such design data structures). Design structure 3090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 3090 may then proceed to a stage 3095 where, for example, design structure 3090: proceeds to tape-out, is released to manufacturing, is released to a mask house, is sent to another design house, is sent back to the customer, etc.

As has been described, in at least one embodiment, a data processing system includes a master, a central request agent, and a plurality of snoopers communicatively coupled to a system fabric for communicating requests subject to retry. The master issues on the system fabric a multicast request intended for the plurality of snoopers. The central request agent receives the multicast request on the system fabric, assigns the multicast request to a particular state machine among a plurality of state machines in the central request agent, and provides the master a coherence response indicating successful completion of the multicast request. The central request agent repetitively issues on the system fabric a multicast request in association with a machine identifier identifying the particular state machine until a coherence response indicates the multicast request is successfully received by all of the plurality of snoopers.

Although embodiments have been described in which various tag fields (e.g., forward, epoch, and operation fields) are been illustrated explicitly as separate tag fields for ease of explanation, in other embodiments the same information can be conveyed utilizing other means. For example, in some embodiments, the number of codepoints in the encoded machine ID can be expanded for those state machines that issue multicasts requests distributed via the central request agent.

Although aspects of the claimed inventions have been described with reference to embodiments in which a TLBIE request is employed as an example of a multicast request that may be distributed by a central request agent, those skilled in the art will appreciate that the disclosed techniques may also be applied to other types of multicast requests. For example, the disclosed techniques may be applied to ICBI (Instruction Cache Block Invalidate) requests, which request invalidation of specified instructions in non-coherent instruction caches.

It should also be appreciated that not all multicast requests need be distributed via the central request agent. For example, in the described examples, PTESYNC and TSYNC commands are not distributed to snoopers via the central request agent because the snoopers (e.g., L2 caches) do not accept and process TSYNC or PTESYNC requests and these commands are consequently not subject to a ping-pong livelock.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission mediaper se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of distributing a multicast request in a data processing system including a master, a central request agent, and a plurality of snoopers communicatively coupled to a system fabric for communicating requests subject to retry, the method comprising:
  issuing, on the system fabric by the master, the multicast request intended for the plurality of snoopers;
  receiving, on the system fabric by the central request agent, the multicast request, assigning the multicast request to a particular state machine among a plurality of state machines in the central request agent, and providing the master a first coherence response indicating successful completion of the multicast request; and
  repetitively issuing, on the system fabric by the central request agent, the multicast request in association with a machine identifier identifying the particular state machine until a second coherence response indicates the multicast request is successfully received by all of the plurality of snoopers.

2. The method of claim 1, wherein the multicast request comprises a translation entry invalidation request.

3. The method of claim 1, wherein:
  each of the plurality of snoopers includes a respective plurality of snoop machines corresponding in number to the plurality of state machines in the central request agent; and the method further comprises:
  based on the machine identifier, each of the plurality of snoopers assigning the multicast request received from the central request agent to a particular snoop machine among the plurality of snoop machines that corresponds to the particular state machine.

4. The method of claim 1, and further comprising:
prior to the repetitively issuing, the central request agent modifying the multicast request to indicate the multicast request is forwarded from the central request agent.

5. The method of claim 1, and further comprising:
responsive to the central request agent repetitively issuing the multicast request, one or more of the plurality of snoopers providing a null coherence response to indicate successful receipt of a prior issuance of the multicast request by the central request agent.

6. The method of claim 1, wherein the multicast request includes multiple operation tenures on the system fabric.

7. The method of claim 6, wherein:
the receiving includes the central request agent receiving at least a first operation tenure and a corresponding second operation tenure;
the assigning incudes the central request agent assigning the first and second operation tenures to the particular state machine; and
the method further comprises the central request agent marking the multicast request as available for distribution to the plurality of snoopers based on assignment of both the first and second operation tenures to the particular state machine.

8. The method of claim 6, wherein:
the repetitively issuing includes the central request agent issuing the first operation tenure of the multicast request on the system fabric with an epoch indication; and
the method further comprising one of the plurality of snoopers discarding a previously snooped multicast request based on a mismatching epoch indication.

9. A data processing system, comprising:
  an integrated circuit configured as a central request agent for multicast requests in the data processing system, wherein the central request agent includes:
    a dispatch circuit configured to be communicatively coupled to a system fabric from which the dispatch circuit receives a multicast request of a master coupled to the system fabric, wherein the multicast request is intended for distribution to a plurality of snoopers coupled to the system fabric;
    a plurality of request forwarding circuits communicatively coupled to the dispatch circuit, wherein each of the plurality of request forwarding circuits is implemented by a respective one of a plurality of state machines, and wherein each of the plurality of request forwarding circuits is configured to receive multicast requests from the dispatch circuit;
    wherein the dispatch circuit is configured to, based on receipt of the multicast request of the master, assign the multicast request to a particular state machine among the plurality of state machines and issue to the master a first coherence response indicating successful completion of the multicast request; and
    wherein the particular state machine is configured to, based on assignment of the multicast request by the dispatch circuit, repetitively issue, on the system fabric, the multicast request in association with a machine identifier identifying the particular state machine until a second coherence response indicates the multicast request is successfully received by all of the plurality of snoopers.

10. The data processing system of claim 9, wherein the multicast request comprises a translation entry invalidation request.

11. The data processing system of claim 9, and further comprising the plurality of snoopers, wherein:
   each of the plurality of snoopers is implemented by integrated circuitry and includes a respective plurality of snoop machines corresponding in number to the plurality of state machines in the central request agent; and
   each of the plurality of snoopers is configured, based on the machine identifier, to assign the multicast request received from the central request agent to a particular snoop machine among the plurality of snoop machines that corresponds to the particular state machine.

12. The data processing system of claim 9, wherein the central request agent is configured to modify, prior to the repetitively issuing the multicast request on the system fabric, modifying the multicast request to indicate the multicast request is forwarded from the central request agent.

13. The data processing system of claim 9, and further comprising the plurality of snoopers, wherein each of the plurality of snoopers is implemented by integrated circuitry and is configured to provide on the system fabric a null coherence response to indicate successful receipt of a prior issuance of the multicast request by the central request agent.

14. The data processing system of claim 9, wherein the multicast request includes multiple operation tenures on the system fabric.

15. The data processing system of claim 14, wherein:
   the multicast request includes at least a first operation tenure and a corresponding second operation tenure;
   the central request agent assigns the first and second operation tenures to the particular state machine; and
   the central request agent is configured to mark the multicast request as available for distribution to the plurality of snoopers based on assignment of both the first and second operation tenures to the particular state machine.

16. The data processing system of claim 14, wherein the particular state machine is configured to repetitively issue the first operation tenure of the multicast request on the system fabric with an epoch indication.

17. The data processing system of claim 9, further comprising:
   the system fabric;
   the master; and
   the plurality of snoopers.

18. A design structure tangibly embodied in a machine-readable storage device for designing, manufacturing, or testing an integrated circuit, the design structure comprising:
   a central request agent, including:
      a dispatch circuit configured to be communicatively coupled to a system fabric of a data processing system from which the dispatch circuit receives a multicast request of a master coupled to the system fabric, wherein the multicast request is intended for distribution to a plurality of snoopers coupled to the system fabric;
   a plurality of request forwarding circuits communicatively coupled to the dispatch circuit, wherein each of the plurality of request forwarding circuits is implemented by a respective one of a plurality of state machines, and wherein each of the plurality of request forwarding circuits is configured to receive multicast requests from the dispatch circuit;
   wherein the dispatch circuit is configured to, based on receipt of the multicast request of the master, assig the multicast request to a particular state machine among the plurality of state machines and issue to the master a first coherence response indicating successful completion of the multicast request; and
   wherein the particular state machine is configured to, based on assignment of the multicast request by the dispatch circuit, repetitively issue, on the system fabric, the multicast request in association with a machine identifier identifying the particular state machine until a second coherence response indicates the multicast request is successfully received by all of the plurality of snoopers.

19. The design structure of claim 18, wherein the multicast request comprises a translation entry invalidation request.

20. The design structure of claim 18, wherein the central request agent is configured to modify, prior to the repetitively issuing the multicast request on the system fabric, the multicast request to indicate the multicast request is forwarded from the central request agent.

21. The design structure of claim 18, wherein the multicast request includes multiple operation tenures on the system fabric.

22. The design structure of claim 21, wherein:
   the multicast request includes at least a first operation tenure and a corresponding second operation tenure;
   the central request agent assigns the first and second operation tenures to the particular state machine; and
   the central request agent is configured to mark the multicast request as available for distribution to the plurality of snoopers based on assignment of both the first and second operation tenures to the particular state machine.

23. The design structure of claim 21, wherein the particular state machine is configured to repetitively issue the first operation tenure of the multicast request on the system fabric with an epoch indication.

* * * * *